US012664730B2

(12) United States Patent     (10) Patent No.:   US 12,664,730 B2

Aleem et al.     (45) Date of Patent:    Jun. 23, 2026

(54) FIT PREDICTION BASED ON FEATURE DETECTION IN IMAGE DATA

(71) Applicant: GOOGLE LLC, Mountain View, CA (US)

(72) Inventors: Idris Syed Aleem, Kitchener (CA); Mayank Bhargava, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 546 days.

(21) Appl. No.: 18/157,498

(22) Filed: Jan. 20, 2023

(65) Prior Publication Data

US 2024/0249477 A1     Jul. 25, 2024

(51) Int. Cl.
| | |
|---|---|
| *G06T 19/00* | (2011.01) |
| *G02C 13/00* | (2006.01) |
| *G06T 7/50* | (2017.01) |
| *G06T 7/60* | (2017.01) |
| *G06T 7/73* | (2017.01) |

(52) U.S. Cl.
CPC ............. *G06T 19/00* (2013.01); *G02C 13/003* (2013.01); *G06T 7/50* (2017.01); *G06T 7/60* (2013.01); *G06T 7/74* (2017.01); *G06T 2200/08* (2013.01); *G06T 2207/30201* (2013.01)

(58) Field of Classification Search
CPC ........... G02C 13/003; G06T 7/74; G06T 7/60; G06T 2200/08; G06T 19/00; G06T 7/50; G06T 2207/30201; G06T 17/00
See application file for complete search history.

(56) References Cited

U.S. PATENT DOCUMENTS

| | | | |
|---|---|---|---|
| 2015/0332459 A1* | 11/2015 | Znamenskiy | ............. G06T 7/80 |
| | | | 348/136 |
| 2016/0246078 A1 | 8/2016 | Choukroun et al. | |
| 2016/0327811 A1* | 11/2016 | Haddadi | ............. G02C 13/005 |
| 2017/0263017 A1 | 9/2017 | Wang | |
| 2019/0146246 A1 | 5/2019 | Fonte et al. | |

(Continued)

FOREIGN PATENT DOCUMENTS

| | | |
|---|---|---|
| CN | 110457092 A | 11/2019 |

OTHER PUBLICATIONS

Ruiz, "Automatic Face Landmarking in 3D", Centre for Vision, Speech and Signal Processing Faculty of Engineering and Physical Sciences, Jan. 2011, 246 pages.

(Continued)

*Primary Examiner* — Phi Hoang

(74) *Attorney, Agent, or Firm* — Brake Hughes Bellermann LLP

(57) ABSTRACT

A system and method of predicting fit of a wearable device from image data obtained by a computing device together with position and orientation of the computing device is provided. The system and method may include capturing a series of frames of image data, and detecting one or more fixed features in the series of frames of image data. Position and orientation data associated with the capture of the image data is combined with the position data related to the one or more fixed features, to extract depth data from the series of frames of image data. A three-dimensional model of is generated based on the extracted depth data. The three-dimensional model is processed by a simulator and/or a machine learning model to predict fit of the wearable device for the user.

18 Claims, 32 Drawing Sheets

(56)          References Cited

U.S. PATENT DOCUMENTS

| | | | |
|---|---|---|---|
| 2020/0160556 A1 | 5/2020 | Cook et al. | |
| 2020/0394841 A1* | 12/2020 | Kaino | G06T 19/006 |
| 2021/0264684 A1* | 8/2021 | Mercer | G06T 19/20 |
| 2021/0406987 A1 | 12/2021 | Kornilov | |
| 2022/0101621 A1 | 3/2022 | Goldberg et al. | |
| 2022/0189110 A1* | 6/2022 | Tang | G06V 40/40 |
| 2022/0350985 A1 | 11/2022 | Aleem et al. | |
| 2022/0351467 A1* | 11/2022 | Selivanov | G06V 40/16 |
| 2022/0357600 A1* | 11/2022 | Fonte | B29D 12/02 |
| 2023/0169742 A1* | 6/2023 | Cascetta | G06T 19/20 |
| | | | 345/419 |
| 2023/0206531 A1* | 6/2023 | Agura | G06T 11/40 |
| | | | 345/473 |
| 2024/0144496 A1* | 5/2024 | Lee | G06T 7/33 |
| 2024/0170139 A1* | 5/2024 | Tan-Ngo | G06T 7/62 |
| 2024/0242388 A1* | 7/2024 | Wang | G06T 9/002 |

OTHER PUBLICATIONS

International Search Report and Written Opinion for PCT Application No. PCT/US2024/010315, mailed on Apr. 24, 2024, 12 pages.

* cited by examiner

600

FIT PREDICTION BASED ON FEATURE DETECTION IN IMAGE DATA

TECHNICAL FIELD

This description relates, in general, to the sizing and/or fitting of a wearable device, and in particular, to the sizing and/or fitting of a head mounted wearable device.

BACKGROUND

A manner in which a wearable device fits a particular wearer may be dependent on features specific to the wearer, how the wearable device interacts with features associated with the specific body part at which the wearable device is worn by the wearer, and the like. In some situations, a wearer may want to customize a wearable device for fit and/or function. For example, when fitting a pair of glasses, the wearer may want to customize the glasses to incorporate selected frame(s), prescription/corrective lenses, a display device, computing capabilities, and other such features. Many existing systems for procurement of these types of wearable devices do not provide for accurate fitting and customization without access to a retail establishment and/or without the assistance of a technician and/or without access to specialized equipment. Existing virtual systems may provide a virtual try-on capability, but may lack the ability to accurately size the wearable device from images of the wearer without specialized equipment. This may result in improper fit of the delivered product. In the case of a head mounted wearable device, such as smart glasses that include display capability and computing capability, improper fit may compromise the functionality.

SUMMARY

Systems and methods are described herein that provide for the selection, sizing and/or fitting of a head mounted wearable device based on series of frames of two-dimensional image data of a user. The series of frames of two-dimensional image data may be captured via an application executing on a computing device operated by the user. A three-dimensional mesh may be generated, that is representative of at least a portion of the head of the user, such as, for example, the face of the user, based on one or more facial landmarks detected within the series of frames of two-dimensional image data. In some examples, depth data may be extracted from the series of frames of two-dimensional image data. The depth data is used to develop one or more depth maps which are fused to in turn generate a three-dimensional mesh, or a three-dimensional model, that is representative of at least a portion of the head of the user. The three-dimensional mesh, or model, and/or facial and/or cranial and/or ophthalmic measurements extracted therefrom, may be provided to a simulator, to predict fit of a head mounted wearable device for the user.

The proposed solution in particular relates to a (computer-implemented) method, in particular a method for partially or fully automated selection, sizing and/or fitting of a head mounted wearable device to user-specific requirements, the method including capturing current image data, via an application executing on a computing device operated by a user, the current image data including a nose of the user; detecting at least one fixed feature in the current image data; detecting a change in a position and an orientation of the computing device; detecting a change in a position of the at least one fixed feature between the current image data and previous image data; correlating the change in the position and the orientation of the computing device with the change in the position of the at least one fixed feature; generating a three-dimensional model of the nose of the user based on depth data extracted from the correlating of the change in position and orientation of the computing device with the change in position and orientation of the at least one fixed feature; and simulating, by a simulation engine accessible to the computing device, a fit of a head mounted wearable device on the head of the user based on the three-dimensional model of the nose of the user.

The details of one or more implementations are set forth in the accompanying drawings and the description below. Other features will be apparent from the description and drawings, and from the claims.

DETAILED DESCRIPTION

Figure 1A:
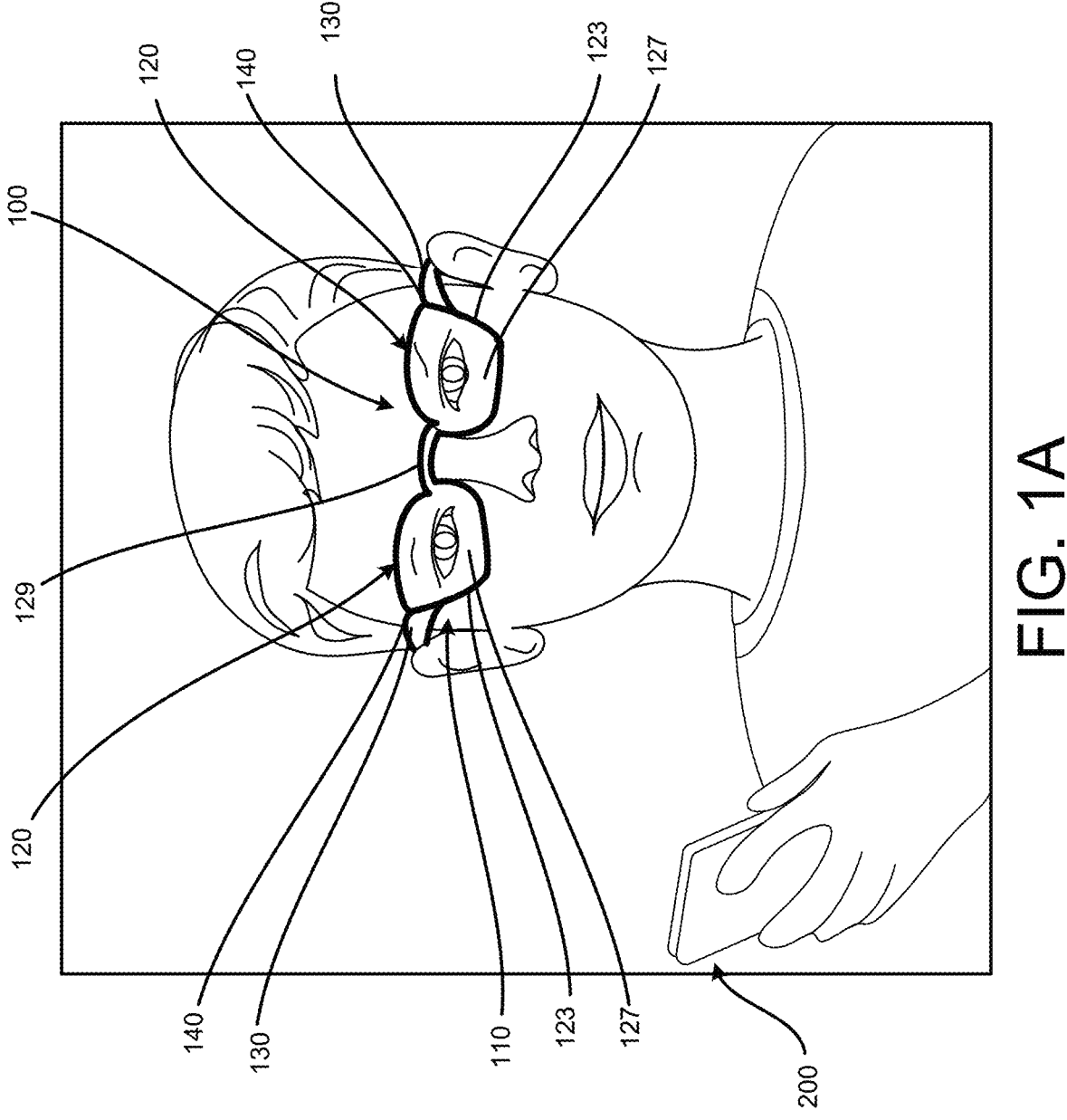
FIG. 1A illustrates an example wearable device worn by a user and an example computing device held by a user.

This disclosure relates to systems and methods for predicting fit of a wearable device for a user, based on image data captured by an image sensor of a computing device. Systems and methods, in accordance with implementations described herein, provide for the development of a depth map, and a three-dimensional mesh model, of a portion of the user on which the wearable device is to be worn. Systems and methods, in accordance with implementations described herein, provide for the development of a depth map and/or a three-dimensional mesh/three-dimensional model, from images captured by the image sensor of the computing device in which the image sensor does not include a depth sensor. In some implementations, the image sensor may be a front facing camera of a mobile device such as a smart phone or a tablet computing device. In some implementations, the depth map and/or the three-dimensional mesh/model may be developed from the images captured by the image sensor of the computing device. In some implementations, the depth map and/or the three-dimensional mesh/model may be developed from the images captured by the image sensor of the computing device combined with data provided by an inertial measurement unit (IMU) of the computing device.

In some implementations, fixed landmarks may be detected in a series or sequence of frames of image data captured by the image sensor of the computing device. The depth map and/or the three-dimensional mesh/model may be developed based on locations of the fixed landmarks in the series frames of image data captured by the image sensor of the computing device, alone or together with data provided by the IMU of the computing device. Development of a depth map and/or a three-dimensional mesh in this manner may allow for sizing and/or fitting of a wearable device for the user based on images captured by the user. Sizing and/or fitting of a wearable device in this manner may provide for relatively accurate sizing and/or fitting, without the need for specialized equipment and/or without assistance from a technician and/or without access to a retail establishment for the sizing and/or fitting of the wearable device.

In some examples, the sizing and/or fitting of a head mounted wearable device, such as, for example, glasses, including smart glasses, may be accomplished based on the detection of fixed facial landmarks in the image data that define a nose of the user, such that a configuration of the nose of the user may be used to determine sizing and/or fitting of the head mounted wearable device. In some examples, a three-dimensional mesh, or model, of the nose, or nose area, of the user, based on one or more depth maps of the nose/nose area, may be provided to a simulator module or engine, to provide for the sizing and/or fitting of the head mounted wearable device. In some examples, the sizing and/or fitting of the head mounted wearable device may be driven by one or more characteristics associated with the nose of the user including, for example, a width at one or more portions of the nose, a slope of the nose, and the like.

In some examples, the one or more characteristics may include a width of the nose at a bridge portion of the nose, at a root end thereof where a bridge portion of the head mounted wearable device would be seated when worn by the user. In some examples, the one or more characteristics may include a slope of the nose along the nasal ridge, or dorsum, extending from a root end portion, or sellion, to a tip end portion of the nose. In some examples, the one or more characteristics may include other measures including, for example, a width at an intermediate portion of the nose, a width at the ala of the nose, a slope along opposite sides of the nose, and other such measures and/or characteristics. Sizing and/or fitting of a head mounted wearable device based on detection of one or more characteristics associated with the nose/nose area of the user based on image data captured in this manner may provide for relatively accurate sizing and/or fitting of the head mounted wearable device without the use of specialized equipment and/or physical and/or virtual proctoring, and the like. Accuracy in sizing and/or fitting of the head mounted wearable device may become particularly important in head mounted wearable devices incorporating display capability, corrective lenses, and the like.

Hereinafter, systems and methods, in accordance with implementations described herein, will be described with respect to images captured by a handheld computing device for the sizing and/or fitting of a head mounted wearable device, such as, for example, glasses, including smart glasses having display capability and computing capability, simply for purposes of discussion and illustration. The principles to be described herein may be applied to the sizing and/or fitting of a wearable device from images captured by an image sensor of a computing device operated by a user, for use in a variety of other scenarios including, for example, the sizing and/or fitting of other types of wearable devices (including devices with or without display and/or computing capabilities), which may make use of the front facing camera of the computing device operated by the user.

The selection of wearable devices, such as head mounted wearable devices in the form of eyewear, or glasses, may rely on the determination of the physical fit, or wearable fit, to ensure that the eyewear is comfortable when worn by the user and/or is aesthetically complementary to the user. The incorporation of corrective lenses into the head mounted wearable device may rely on the determination of ophthalmic fit, to ensure that the head mounted wearable device can provide the desired vision correction. In the case of a head mounted wearable device including computing capability, for example, in the form of smart glasses including computing/processing capability and display capability, selection may also rely on the determination of a display fit, to ensure that visual content is visible to the user. Existing systems for procurement of these types of wearable devices do not provide for accurate fitting and customization, particularly without access to a retail establishment and/or specialized equipment and/or the assistance of a technician. That is, accurate sizing and/or fitting often relies on the user having access to a retail establishment, where samples are available for physical try on, and an optician is available to facilitate the determination of wearable fit and/or ophthalmic fit and/or aesthetic fit based on physical try-on and measurements collected using specialized equipment. In some situations, existing virtual systems that provide for online selection of a wearable device, such as eyewear, or glasses, simply superimpose an image of a selected frame on an image of the user, with only limited regard to actual physical sizing and fit of the selected frame for the user. Accuracy in sizing and fitting is particularly important in providing for the proper functionality of head mounted wearable devices including display capability and/or corrective lenses. The virtual placement of the image of the selected frame on the image of the user does not take into account user facial features which may affect the fit of the physical frames on the user. For example, variation in nose bridge height and/or nose bridge width and/or and nose slope may affect how a physical frame physically fits, and is physically positioned on the face/head of the user, affecting fit and function of the head mounted wearable device when worn by the user. Thus, these types of systems can yield inaccurate results in the selection of eyewear.

Hereinafter, systems and methods will be described with respect to the selection, sizing and/or fitting of a head mounted wearable device, simply for purposes of discussion and illustration. The principles to be described herein can be applied to the sizing and fitting of other types of wearable devices including, for example, glasses that may or may not include processing/computing/display capability and/or corrective lenses. Hereinafter, systems and methods will be described with respect to the selection, sizing and/or fitting of a head mounted wearable device based on the detection of facial landmarks defining features associated with the nose of the user, for the development of a depth map and/or a three-dimensional mesh/model of the nose, to be used in the selection and sizing/fitting of the head mounted display device for the user. The principles to be described herein may make use of other features, instead of, or in addition to, the features associated with the nose as detailed herein.

Figure 1B:
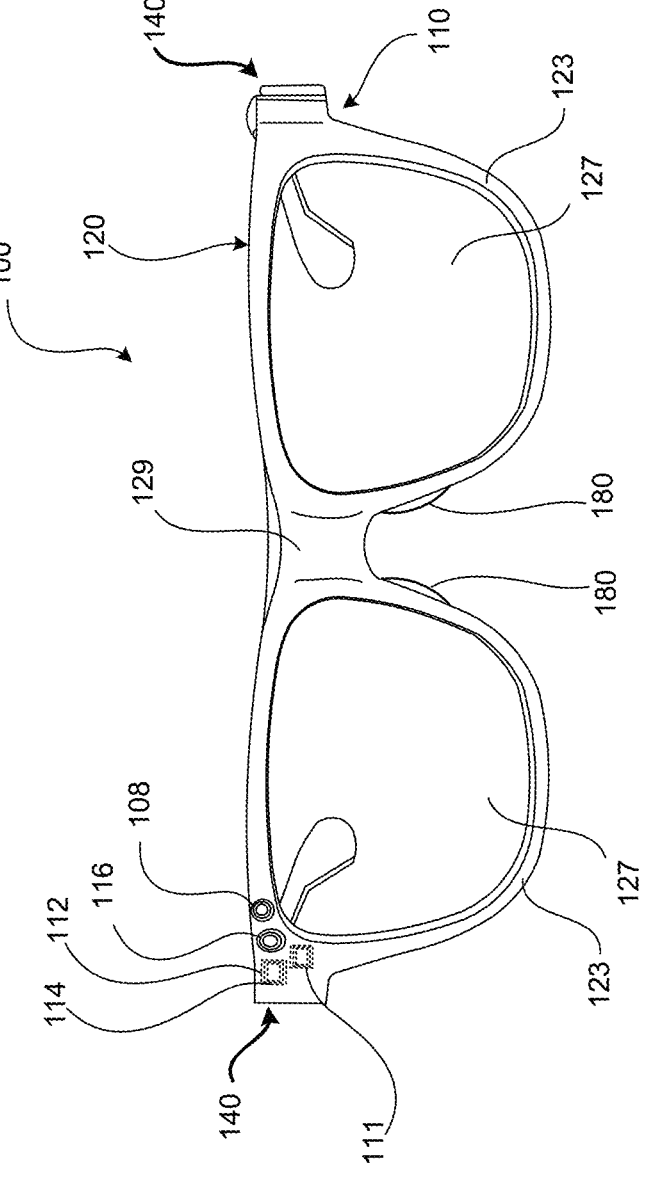
FIG. 1B is a front view of the example wearable device shown in FIG. 1A.
Figure 1C:
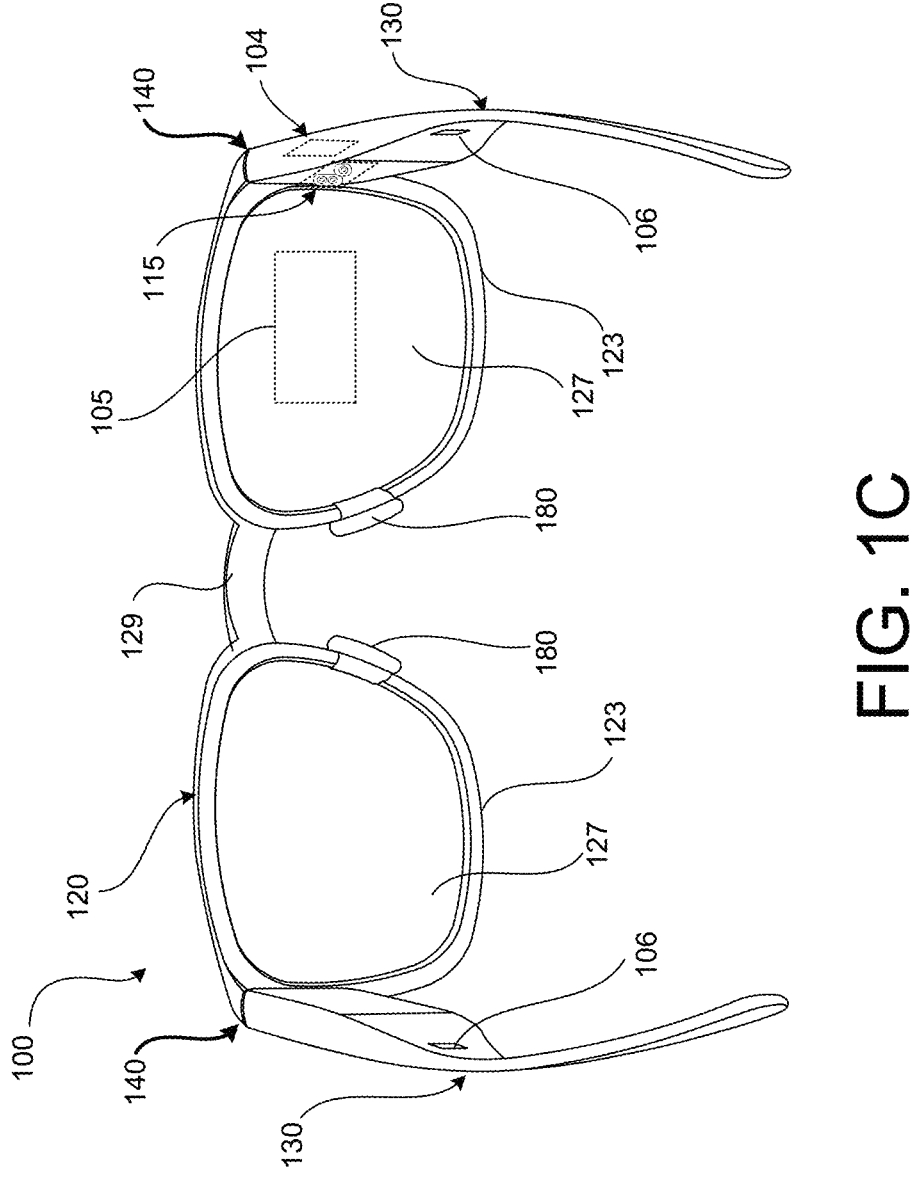
FIG. 1C is a rear view of the example wearable device shown in FIG. 1A.
Figure 1D:
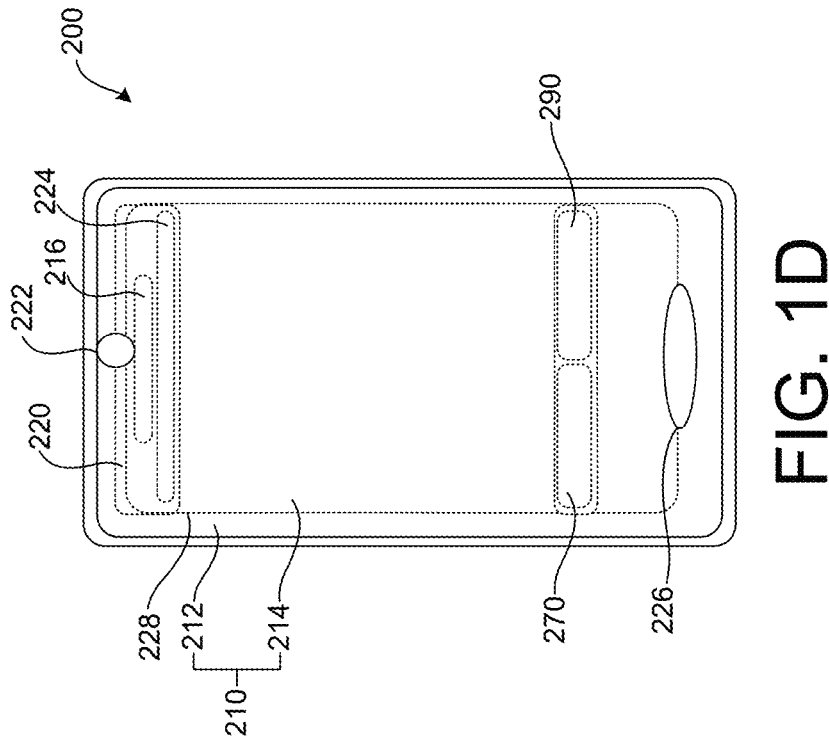
FIG. 1D is a front view of the example computing device shown in FIG. 1A.

FIG. 1A illustrates a user wearing an example head mounted wearable device 100 in the form of smart glasses, or augmented reality glasses, including display capability, eye/gaze tracking capability, and computing/processing capability, with a computing device 100, in the form of a handheld computing device, such as a smart phone, held by the user. FIG. 1B is a front view, and FIG. 1C is a rear view, of the example head mounted wearable device 100 shown in FIG. 1A. FIG. 1D is a front view of the example computing device 200 shown in FIG. 1A.

The example head mounted wearable device 100 includes a frame 110. The frame 110 includes a front frame portion 120, and a pair of arm portions 130 rotatably coupled to the front frame portion 120 by respective hinge portions 140. The front frame portion 120 includes rim portions 123 surrounding respective optical portions in the form of lenses 127, with a bridge portion 129 connecting the rim portions 123. The bridge portion 129 may be seated on the bridge portion of the nose of the user, proximate the root end of the nose, or sellion. The arm portions 130 are coupled, for example, pivotably or rotatably coupled, to the front frame portion 120 at peripheral portions of the respective rim portions 123. In some examples, the lenses 127 are corrective/prescription lenses. In some examples, the lenses 127 are an optical material including glass and/or plastic portions that do not necessarily incorporate corrective/prescription parameters.

In some examples, the wearable device 100 includes a display device 104 that can output visual content, for example, at an output coupler 105, so that the visual content is visible to the user. In the example shown in FIGS. 1B and 1C, the display device 104 is provided in one of the two arm portions 130, simply for purposes of discussion and illustration. Display devices 104 may be provided in each of the two arm portions 130 to provide for binocular output of content. In some examples, the display device 104 may be a see through near eye display. In some examples, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 127, next to content (for example, digital images, user interface elements, virtual content, and the like) output by the display device 104. In some implementations, waveguide optics may be used to depict content on the display device 104.

In some examples, the head mounted wearable device 100 includes one or more of an audio output device 106 (such as, for example, one or more speakers), an illumination device 108, a sensing system 111, a control system 112, at least one processor 114, and an outward facing image sensor 116 (for example, a camera). In some examples, the sensing system 111 may include various sensing devices and the control system 112 may include various control system devices including, for example, one or more processors 114 operably coupled to the components of the control system 112. In some examples, the control system 112 may include a communication module providing for communication and exchange of information between the wearable device 100 and other external devices.

In some examples, the head mounted wearable device 100 includes a gaze tracking device 115 to detect and track eye gaze direction and movement. Data captured by the gaze tracking device 115 may be processed to detect and track gaze direction and movement as a user input. In the example shown in FIGS. 1B and 1C, the gaze tracking device 115 is provided in one of the two arm portions 130, simply for purposes of discussion and illustration. In the example arrangement shown in FIGS. 1B and 1C, the gaze tracking device 115 is provided in the same arm portion 130 as the display device 104, so that user eye gaze can be tracked not only with respect to objects in the physical environment, but also with respect to the content output for display by the display device 104. In some examples, gaze tracking devices 115 may be provided in each of the two arm portions 130 to provide for gaze tracking of each of the two eyes of the user.

In some examples, the head mounted wearable device 100 can include pads 180 provided on the front frame portion 120 of the frame 110. In the example shown in FIGS. 1B and 1C, a first pad 180 is positioned on a portion of a first of the rim portions 123, at a position corresponding to where the first rim portion 123 would rest on a first side of the nose of the user, and a second pad 180 is positioned on a portion of a second of the rim portions 123, at a position corresponding to where the second rim portion would rest on a second side of the nose of the user. In some examples, the pads 180 may provide for adjustment of a position of the frame 110 on the nose of the user, and/or may maintain a position of the frame 110 on the nose/relative to the eyes of the user. The adjustment of the position of the frame 110 and/or the maintaining of the position of the frame 110 provided by the pads 180 may maintain alignment of the eyes with the lenses 127 and/or with corrective features of the lenses 127. The adjustment of the position of the frame 110 and/or the maintaining of the position of the frame 110 provided by the pads 180 may help to position content output by the display device 104 within the field of view of the user, in a head mounted wearable device 100 that includes display capability. In some examples, the pads 180 may enhance user comfort. In some examples, the pads 180 may be removably coupled to the rim portions 123. This may allow the position of the frame 110 to be customized for a particular user, and/or provide for fine tuning of a position of the frame 110 for a particular user. For example, different pads 180, having different sizes and/or shapes and/or configurations, may be coupled onto the rim portions 123, to provide a type and/or level of adjustment in position of the frame 110 that best positions the frame 110 on the nose/face of a particular user.

FIG. 1D is a front view of the example computing device 200 shown in FIG. 1A. In this example, the computing device 200 is in the form of a handheld computing device such as a smart phone, that can be operated by the user. The example computing device 200 may include an interface device 210. In some implementations, the interface device 210 may function as an input device, including, for example, a touch surface 212 that can receive touch inputs from the user. In some implementations, the interface device 210 may function as an output device, including, for example, a display portion 214 allowing the interface device 210 to output information to the user. In some implementations, the interface device 210 can function as an input device and an output device. The example computing device 200 may include an audio output device 216, or speaker, that outputs audio signals to the user.

The example computing device 200 may include a sensing system 220 including various sensing system devices. In some examples, the sensing system devices include, for example, one or more image sensors, one or more position and/or orientation sensors, one or more audio sensors, one or more touch input sensors, and other such sensors. The example computing device 200 shown in FIG. 1D includes an image sensor 222. In the example shown in FIG. 1D, the image sensor 222 is a front facing camera. The example computing device 200 may include additional image sensors such as, for example, a world facing camera. The example computing device 200 may include an inertial measurement unit (IMU) 224 including, for example, one or more position sensors and/or orientation sensors and/or acceleration sensors such as, for example, an accelerometer, a gyroscope, a magnetometer, and other such sensors that can provide position and/or orientation and/or acceleration data. The example computing device 200 may include an audio sensor 226 that can detect audio signals, for example, for processing as user inputs. The example computing device 200 may include a touch sensor 228, for example corresponding to the touch surface 212 of the interface device 210. The touch sensor 228 can detect touch input signals for processing as user inputs. The example computing device 200 may include a control system 270 including various control system devices. The example computing device 200 may include a processor 290 to facilitate operation of the computing device 200.

As noted above, a computing device, such as the example computing device 200 shown in FIG. 1D, may be used to capture images of the user. Sequential frames of image data captured by the example computing device, alone or together with position data and/or orientation data associated with the example computing device 200 as the sequential frames of image data are captured, to develop one or more depth map(s) from which a three-dimensional mesh may be developed. The three-dimensional mesh may be provided to, for example, a sizing and/or fitting simulator for the virtual sizing and/or fitting of a wearable device such as the example head mounted wearable device 100 described above. This may allow the user to use the computing device 200 for the virtual selection and sizing/fitting of wearable device, such as the glasses described above, without the use of specialized equipment, without a proctored virtual fitting, without access to a retail establishment, and the like.

Numerous different sizing and fitting measurements and/or parameters may be taken into account when selecting and/or sizing and/or fitting a wearable device, such as the example head mounted wearable device 100 shown in FIGS. 1A-1C, for a particular user. This may include, for example, wearable fit parameters, or wearable fit measurements. Wearable fit parameters/measurements may take into account how a particular frame 110 fits and/or looks and/or feels on a particular user. Wearable fit parameters/measurements may take into consideration numerous factors such as, for example, whether the rim portions 123 and bridge portion 129 are shaped and/or sized so that the bridge portion 129 rests comfortably on the bridge of the nose of the user, whether the frame 110 is wide enough to be comfortable with respect to the temples, but not so wide that the frame 110 cannot remain relatively stationary when worn by the user, whether the arm portions 130 are sized to comfortably rest on the ears of the user, and other such comfort related considerations. Wearable fit parameters/measurements may take into account other as-worn considerations including how the frame 110 may be positioned based on the natural head pose of the user, i.e., where the user tends to naturally wear glasses. In some examples, aesthetic fit measurements or parameters may be taken into account, such as whether the frame 110 is aesthetically pleasing to the user/compatible with the user's facial features, and the like.

In a head mounted wearable device including display capability, display fit parameters, or display fit measurements may be taken into account in selecting and/or sizing and/or fitting the head mounted wearable device 100 for a particular user. Display fit parameters/measurements may be used to configure the display device 104 for a selected frame 110 for a particular user, so that content output by the display device 104 is visible to the user. For example, display fit parameters/measurements may facilitate calibration of the display device 104, so that visual content is output within at least a set portion of the field of view of the user. For example, the display fit parameters/measurements may be used to configure the display device 104 to provide at least a set level of gazability, corresponding to an amount, or portion, or percentage of the visual content that is visible to the user at a periphery (for example, a least visible corner) of the field of view of the user.

Figures 2A, 2B, 2C:
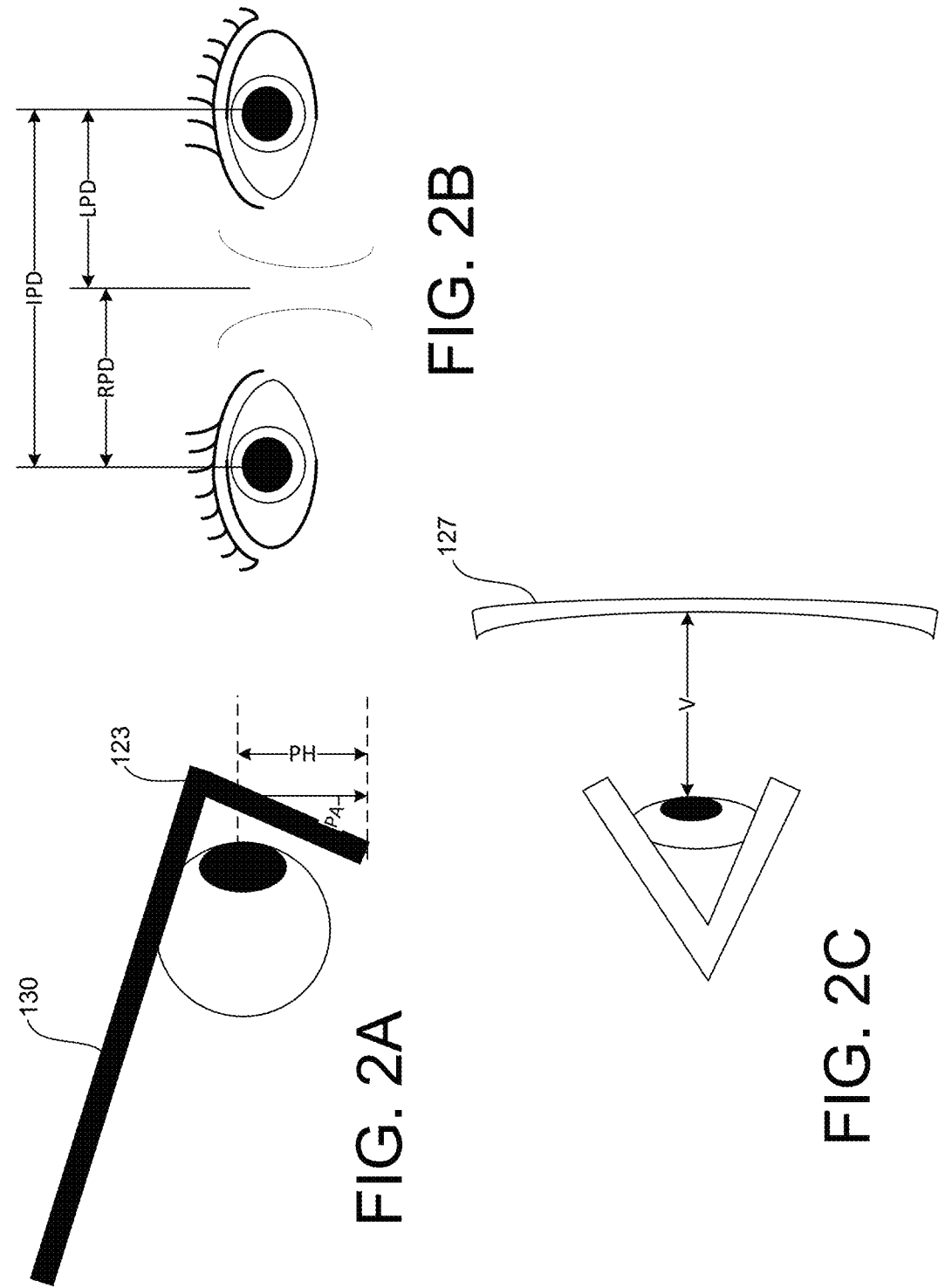
FIGS. 2A-2C illustrate example ophthalmic fit measurements.

In an example in which the head mounted wearable device 100 is to include corrective lenses, ophthalmic fit parameters, or ophthalmic fit measurements may be taken into account in the selecting and/or sizing and/or fitting process. Some example ophthalmic fit measurements are shown in FIGS. 2A-2C. Ophthalmic fit measurements may include, for example, a pupil height PH, which may represent a distance from a center of the pupil to a bottom of the respective lens 127. Ophthalmic fit measurements may include an interpupillary distance IPD, which may represent a distance between the pupils. IPD may be characterized by a monocular pupil distance, for example, a left pupil distance LPD representing a distance from a central portion of the bridge of the nose to the left pupil, and a right pupil distance RPD representing a distance from the central portion of the bridge of nose to right pupil. Ophthalmic fit measurements may include a pantoscopic angle PA, representing an angle defined by the tilt of the lens 127 with respect to a vertical plane. Ophthalmic fit measurements may include a vertex distance V representing a distance from the cornea to the respective lens 127. Ophthalmic fit measurements may include other such parameters, or measures that provide for the selecting and/or sizing and/or fitting of a head mounted wearable device 100 including corrective lenses, with or without a display device 104 as described above. In some examples, ophthalmic fit measurements, together with display fit measurements, may provide for the output of visual content by the display device 104 within a defined three-dimensional volume such that content is within a corrected field of view of the user, and thus visible to the user.

Figure 3:
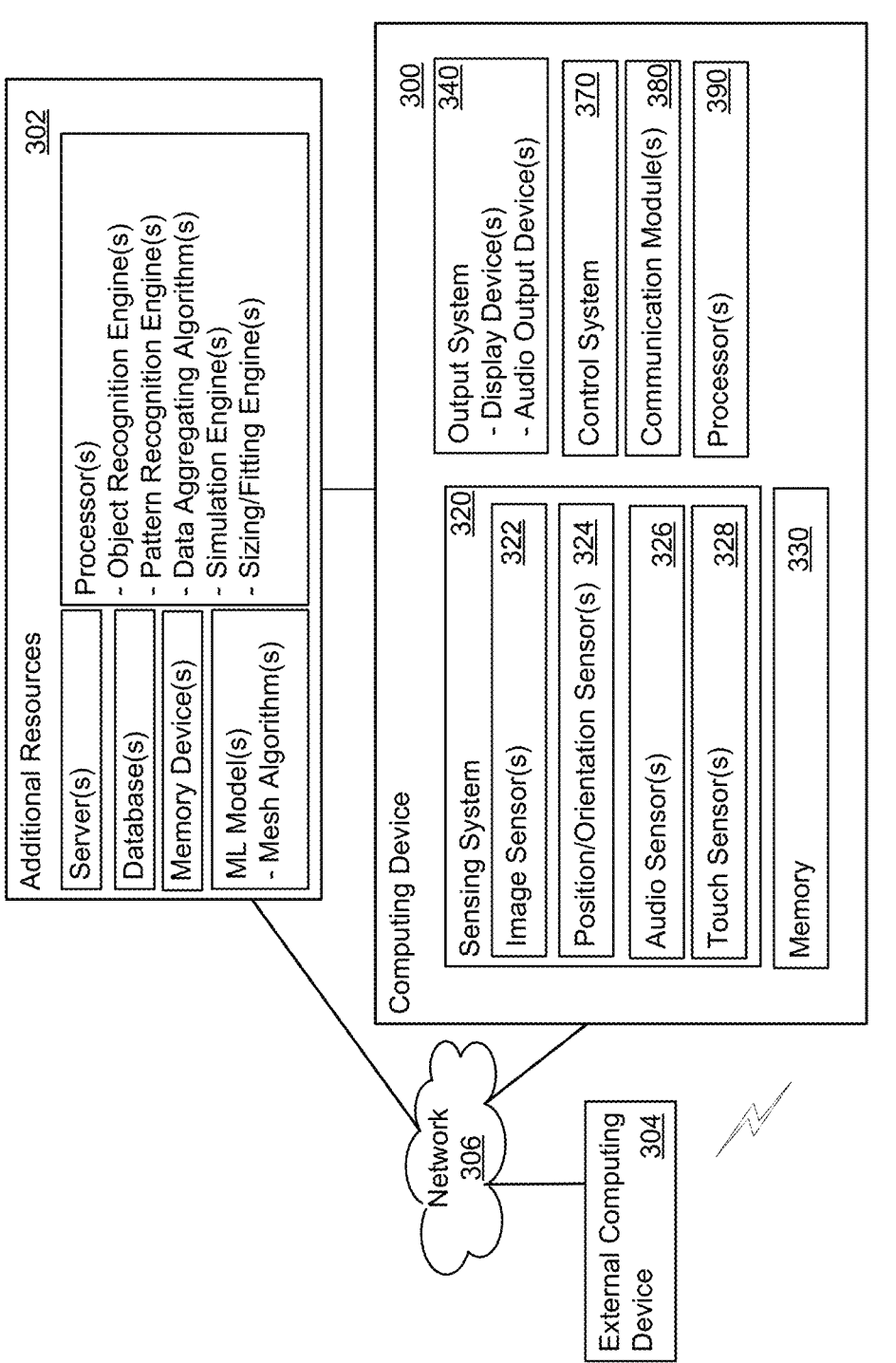
FIG. 3 is a block diagram of a system.

FIG. 3 is a block diagram of an example system for sizing and/or fitting of a wearable device, such as the example head mounted wearable device 100 described above, from images captured by a computing device, such as the example computing device 200 described above.

The example system may include a computing device 300. The computing device 300 can access additional resources 302 to facilitate the sizing and/or fitting of a wearable device. In some examples, the additional resources 302 may be available locally on the computing device 300. In some examples, the additional resources 302 may be available to the computing device 300 via a network 306. In some examples, some of the additional resources 302 may be available locally on the computing device 300, and some of the additional resources 302 may be available to the computing device 300 via the network 306. The additional resources 302 may include, for example, server computer systems, processors, databases, memory storage, and the like. In some examples, the processor(s) may include object recognition engine(s) and/or module(s), pattern recognition engine(s) and/or module(s), configuration identification engine(s) and/or modules(s), simulation engine(s) and/or module(s), sizing/fitting engine(s) and/or module(s), and other such processors. In some examples, the additional resources 302 can include more, or fewer, components than shown, and/or different combinations of components than shown.

The computing device 300 can operate under the control of a control system 370. The computing device 300 can communicate with one or more external devices 304, either directly (via wired and/or wireless communication), or via the network 306. In some examples, the one or more external devices may include another wearable computing device, another mobile computing device, and the like. In some implementations, the computing device 300 includes a communication module 380 to facilitate external communication. In some implementations, the computing device 300 includes a sensing system 320 including various sensing system components. The sensing system components may include, for example one or more image sensors 322, one or more position/orientation sensor(s) 324 (including for example, an inertial measurement unit, an accelerometer, a gyroscope, a magnetometer and other such sensors), one or more audio sensors 326 that can detect audio input, one or more touch input sensors 328 that can detect touch inputs, and other such sensors. The computing device 300 can include more, or fewer, sensing devices and/or combinations of sensing devices.

In some implementations, the one or more image sensor(s) 322 may include, for example, cameras such as, for example, one or more forward facing cameras, one or more outward, or world facing, cameras, and the like. The one or more image sensor(s) 322 can capture still and/or moving images of an environment outside of the computing device 300. The still and/or moving images may be displayed by a display device of an output system 340, and/or transmitted externally via a communication module 380 and the network 306, and/or stored in a memory 330 of the computing device 300. The computing device 300 may include one or more processor(s) 390. The processors 390 may include various modules or engines configured to perform various functions. In some examples, the processor(s) 390 may include object recognition engine(s) and/or module(s), pattern recognition engine(s) and/or module(s), configuration identification engine(s) and/or modules(s), simulation engine(s) and/or module(s), sizing/fitting engine(s) and/or module(s), and other such processors. The processor(s) 390 may be formed in a substrate configured to execute one or more machine executable instructions or pieces of software, firmware, or a combination thereof. The processor(s) 390 can be semiconductor-based including semiconductor material that can perform digital logic. The memory 330 may include any type of storage device that stores information in a format that can be read and/or executed by the processor(s) 390. The memory 330 may store applications and modules that, when executed by the processor(s) 390, perform certain operations. In some examples, the applications and modules may be stored in an external storage device and loaded into the memory 330.

Figure 4A:
FIG. 4A illustrates use of an example computing device in an image capture mode.

FIG. 4A illustrates the use of a computing device, such as the example handheld computing device 200 shown in FIGS. 1A and 1D, to capture images for the virtual selection and/or sizing and/or fitting of a wearable device, such as the example head mounted wearable device 100 shown in FIGS. 1A-1C. In particular, FIG. 4A illustrates the use of a computing device to capture images, using a front facing camera of the computing device, for use in the virtual selection and/or sizing and/or fitting of a wearable device. As noted above, the principles described herein can be applied to the use of a handheld computing device such as the example handheld computing device 200 shown in FIGS. 1A and 1D, as well as other types of computing devices and/or to the selection and/or sizing and/or fitting of a wearable device such as the head mounted wearable device 100 shown in FIGS. 1A-1C, as well as other types of wearable devices.

Figure 4B:
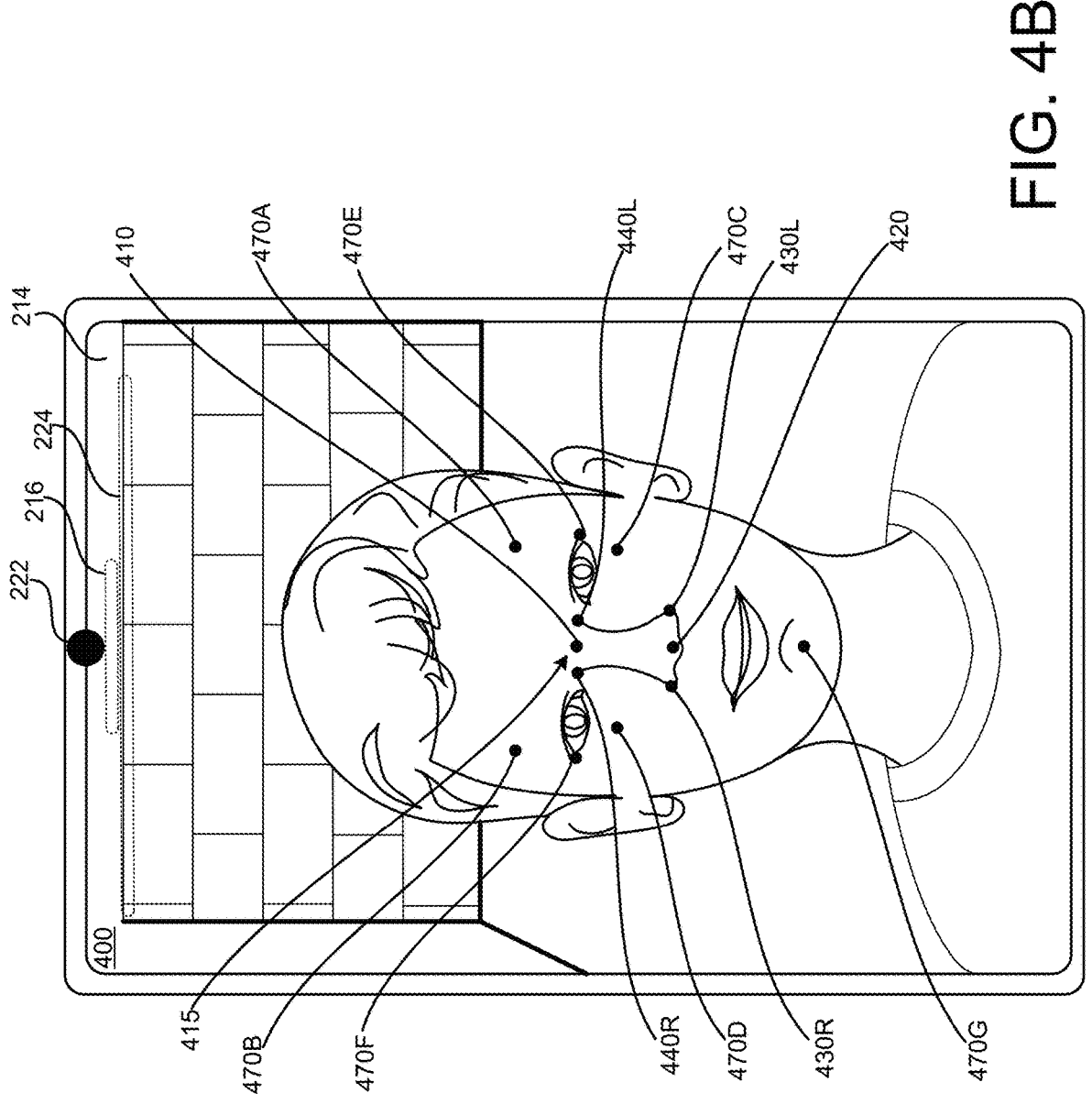
FIG. 4B illustrates an example display portion of the example computing device shown in FIG. 4A.

In the example shown in FIG. 4A, the user is holding the example handheld computing device 200 so that the head and face of the user is in the field of view of the image sensor 222 of the computing device 200. In particular, the head and face of the user is in the field of view of the image sensor 222 of the front facing camera of the computing device 200, so that the image sensor 222 can capture images of the head and face of the user. In some examples, images captured by the image sensor 222 are displayed to the user on the display portion 214 of the computing device 200. This may allow the user to verify the initial positioning of the head and face of the user within the field of view of the image sensor 222. FIG. 4B illustrates an example image frame 400 captured by the image sensor 222 of the computing device 200 during an image data capture process using the computing device 200 operated by the user. The image data captured by the image sensor 222 may be processed, for example, by resources available to the computing device 200 as described above (for example, the additional resources 302 described above with respect to FIG. 3) for the virtual selection and/or sizing and/or fitting of a wearable device. In some examples, the capture of image data and the accessing of the additional resources 302 may be performed via an application executing on the computing device 200.

Systems and methods, in accordance with implementations described herein, may detect one or more features, or landmarks, or key points, within image data represented by a series of frames of image data captured in this manner. Depth data may be extracted from the series of frames of image data, to develop one or more corresponding depth maps, from which a three-dimensional mesh, or model, may be generated. In some examples, the detection of the one or more features, or landmarks, or key points in the series of frames of image data may be combined with position and/or orientation data provided by sensors such as, for example, position and/or orientation sensors included in the IMU 224 of the computing device 200, as the series of frames of image data is captured.

The image data captured by the image sensor 222 may be processed, for example, by a recognition engine of the additional resources 302, to detect and/or identify various fixed features and/or landmarks and/or key points in the image data/series of image frames captured by the image sensor 222. In the example shown in FIG. 4B, various example facial landmarks have been identified in the example image frame 400. In the example shown in FIG. 4B, the example facial landmarks 470 include a landmark 470A and a landmark 470B, corresponding to detected temple portions of the face of the user. The example facial landmarks 470 include a landmark 470C and a landmark 470D corresponding to detected cheek portions of the face of the user. A landmark 470E and a landmark 470F correspond to outer corners of the eyes of the user. A landmark 470G corresponds to a detected chin portion of the user.

As noted above, in some examples, the sizing and/or fitting of the head mounted wearable device 100 may be accomplished based on characteristics and/or measurements of the nose of the user. In particular, a configuration of the nose, including for example, a size, a shape, and the like of the nose, may be used to predict sizing and/or fitting of the head mounted wearable device for a particular user. In some examples, one or more characteristics of the configuration of the nose of the user may provide a relatively reliable basis for the sizing and/or fitting of the head mounted wearable device 100. Accordingly, as shown in FIG. 4B, one or more facial landmarks associated with the nose of the user may be detected in the image data. For example, a landmark 410, corresponding to a sellion, or root end portion 415, of the nose of the user may be detected in the image data. A landmark 420, corresponding to a tip end portion of the nose of the user, may be detected in the image data. In some examples, landmarks 430R and 430L, corresponding to right and left portions of the lower end portion of the nose, defining the ala, may be detected in the image data. In some examples, landmarks 440R and 440L, corresponding to left and right bounds of the bridge of the nose at the root end portion 415 of the nose, may be detected in the image data. In some examples, a distance between the landmarks 440R and 440L may define a width at the bridge of the nose.

Hereinafter, systems and methods, in accordance with implementations described herein, will be described with respect to the use of characteristics associated with the nose of the user, and the development of the three-dimensional mesh, or model of the nose of the user, from image data captured by the user operating a computing device such as the example handheld computing device 200. Thus, the description to follow will focus on the use of the example facial landmarks 410 and/or 420 and/or 430R/430L and/or 440R/440L, simply for purposes of discussion and illustration. The principles described herein can be applied to the use of more, or fewer facial landmarks associated with the nose of the user, instead of or in addition to the example facial landmarks 410 and/or 420 and/or 430R/430L and/or 440R/440L and/or different combinations thereof. Further, the principles described herein can be applied to the use of more, or fewer facial landmarks, and/or different combinations of facial landmarks, for the sizing and/or fitting of the head mounted wearable device 100.

Figure 4C:
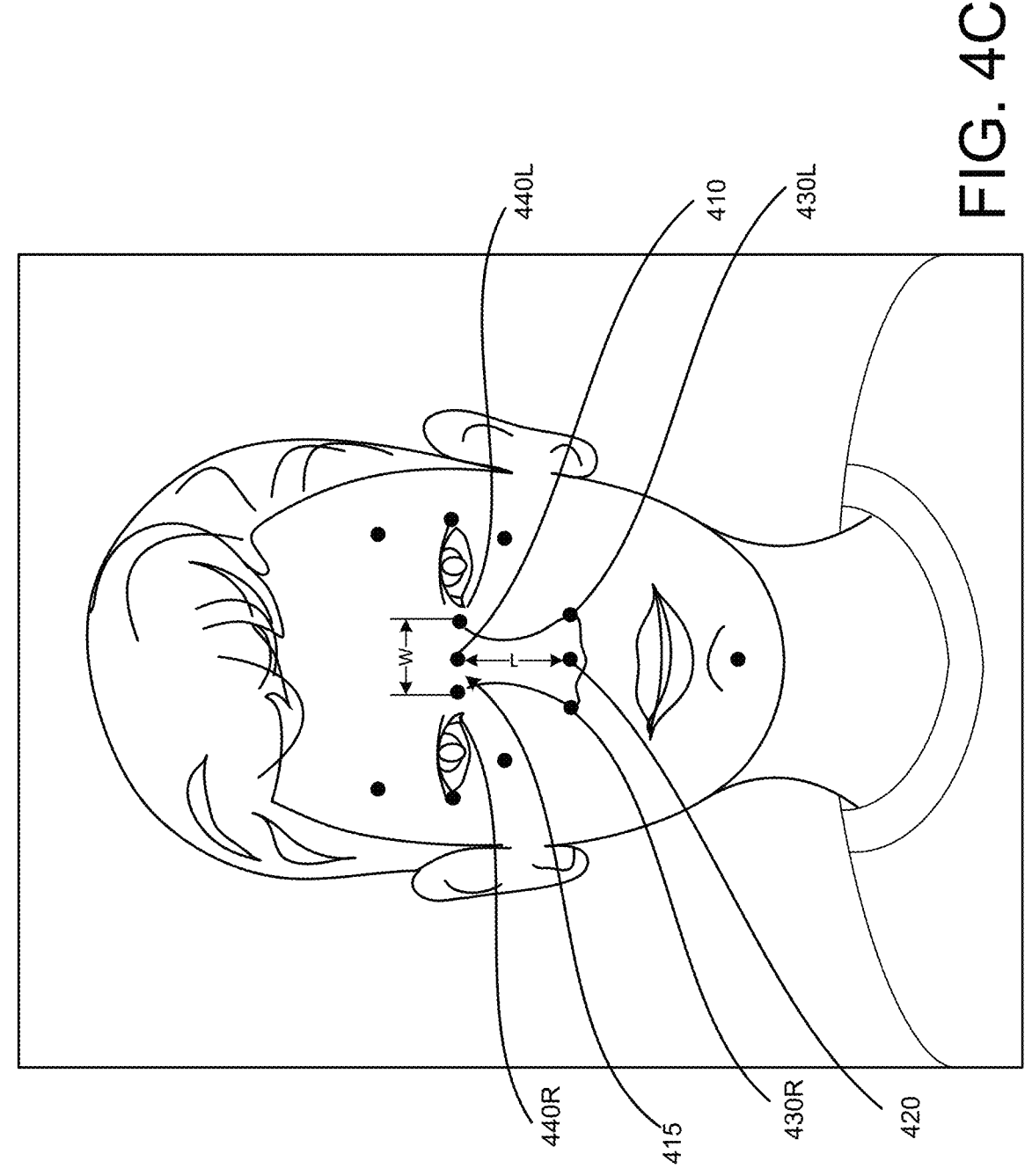
FIGS. 4C and 4D illustrate example landmarks detectable in image data captured by the example computing device shown in FIG. 4A.
Figure 4D:
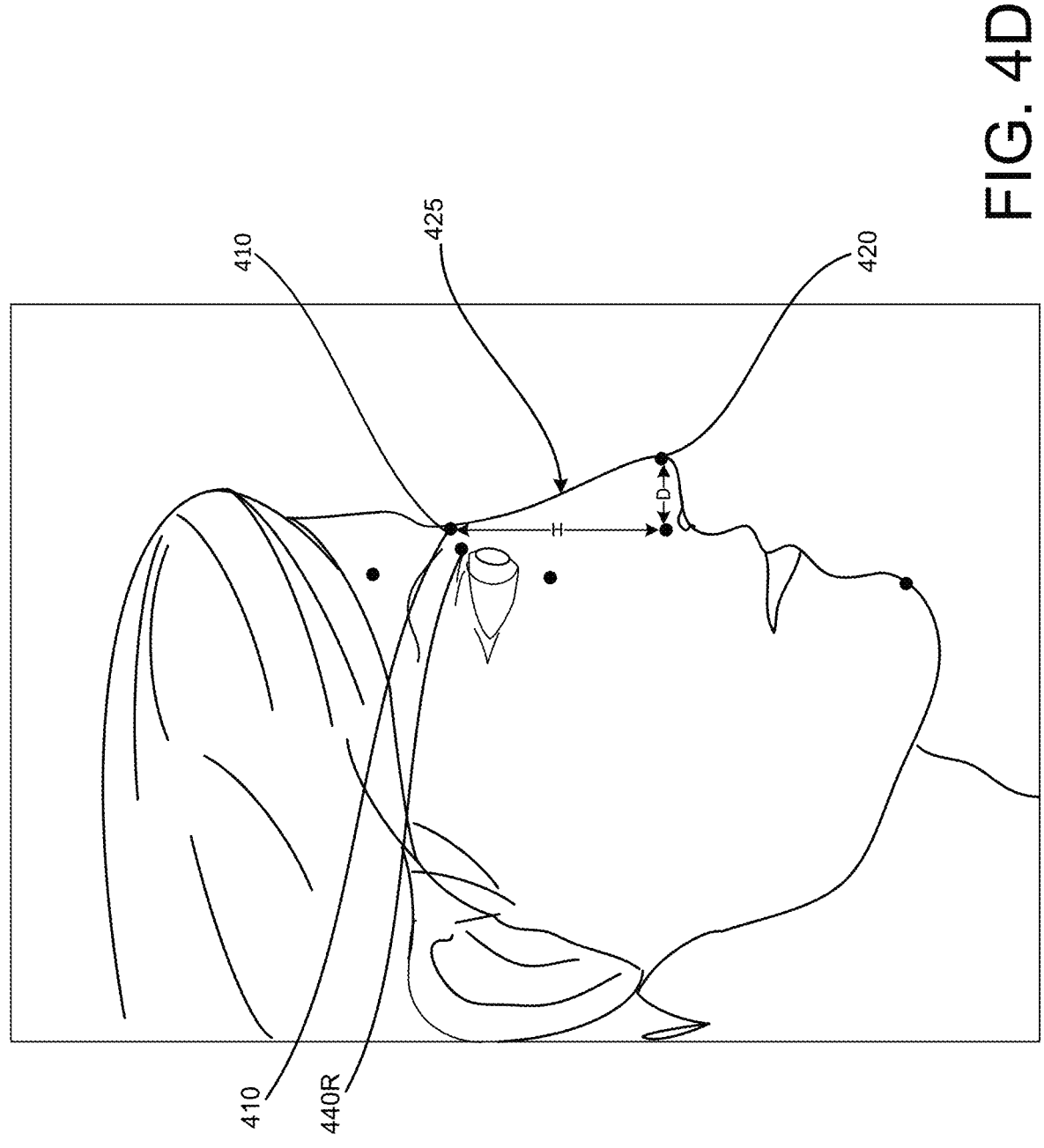

FIGS. 4C and 4D illustrate the identification of characteristics, and/or measurements, associated with the nose of the user that can be determined based on landmarks identified within the image data captured by the computing device 200 operated by the user.

In some examples, a width W of the nose may be determined, for use in the sizing and/or fitting of the head mounted wearable device 100. In some examples, the width W may represent a width at a portion of the nose at which the bridge portion 129 of the head mounted wearable device 100 is seated when worn by the user. In some examples, the determination of the width W may be based on the detection of one or more facial landmarks in the image data captured by the computing device operated by the user. For example, the width W may be a width of the nose at the landmark 410, corresponding to the sellion, at the root end portion 415 of the nose. In some examples, the width W may represent a distance between the landmark 440R (corresponding to the right outer portion of the nose, at the root end portion 415 of the nose, or bridge portion of the nose) and the landmark 440L (corresponding to the left outer portion of the nose, at the root end portion 415 of the nose, or bridge portion of the nose) at the root end portion 415 of the nose. In some examples, the width W of the nose, taken at the root end portion 415 of the nose as shown, may provide a basis for the sizing and/or fitting of the head mounted wearable device 100. In some examples, the width W of the nose, and in particular the width W of the nose at the root end portion 415, where the bridge portion 129 of the head mounted wearable device 100 would be seated when worn by the user, provides a relative accurate basis for the sizing and/or fitting of the head mounted wearable device 100. In some examples, the width W of the nose, for example, the bridge width of the nose, taken at the root end portion of the nose, may provide an initial basis and/or a singular basis for the sizing and/or fitting of the head mounted wearable device 100.

In some examples, a slope of the nose, for example, a slope of the nose along the dorsum, or nasal ridge 425, may be determined, for use in the sizing and/or fitting of the head mounted wearable device 100. In some examples, the slope of the nose along the dorsum, or nasal ridge 425, may provide an indication of where the bridge portion 129 of a particular frame 110 of a head mounted wearable device would be seated along the nasal ridge 425 and/or would remain seated. In some examples, the slope of the nose along the nasal ridge 425 may provide an indication of whether or not a particular frame 110 would remain seated at the root end portion 415 of the nose on a particular user. In some examples, the slope S of the nose, along the nasal ridge 425 may be determined by dividing a height H of the nose by a depth D of the nose. As shown in FIG. 4D, in some examples, the height D of the nose may correspond to a distance between the landmark 410 at the root end portion 415 of the nose, and the landmark 430 (i.e., 430R, 430L) at lower end portion of the nose, defining the ala.

As noted above, in some examples, image data, for example, a series of frames of image data, may be captured by the computing device 200 operated by the user, for example, via an application executing on the computing device 200. The image data may be processed, for example, by an object and/or pattern recognition engine and/or module accessible to the computing device 200, to detect the various facial landmarks and associated measurements described above. In some examples, the detection of these landmarks may be combined with movement data, such as position and/or orientation and/or acceleration data provided by the IMU 224 of the computing device 200 as the sequential frames of image data are captured, to apply scale and determine distances between the respective landmarks, such as the width W, height H, depth D, and slope S described above. One or more depth maps may be generated as the sequential frames of image data are captured, and a three-dimensional mesh may be generated from the one or more depth maps, by, for example, modeling engine or module accessible to the computing device 200. In the examples described herein, one or more depth map(s) and a three-dimensional mesh or model of the nose/nose area of the user may be generated, for the sizing and/or fitting of the head mounted wearable device 100. The three-dimensional mesh or model may be provided to a simulation module and/or engine, for the sizing and/or fitting of the head mounted wearable device 100.

FIGS. 5A-5J illustrate the use of a computing device, such as the example handheld computing device 200 shown in FIGS. 1 and 1D, to capture image data. In particular, FIGS. 5A-5J illustrate a series of movements of the example handheld computing device 200 to capture image data including a series of sequentially captured frames of image data, including a plurality of different perspectives of the face and/or head of the user, including in particular a portion of the face/head of the user including the nose. Image data captured as illustrated in the example shown in FIGS. 5A-5J may be used in predicting virtual sizing and/or fitting of a wearable device such as the example head mounted wearable device 100 shown in FIGS. 1A-1C.

Figure 5A:
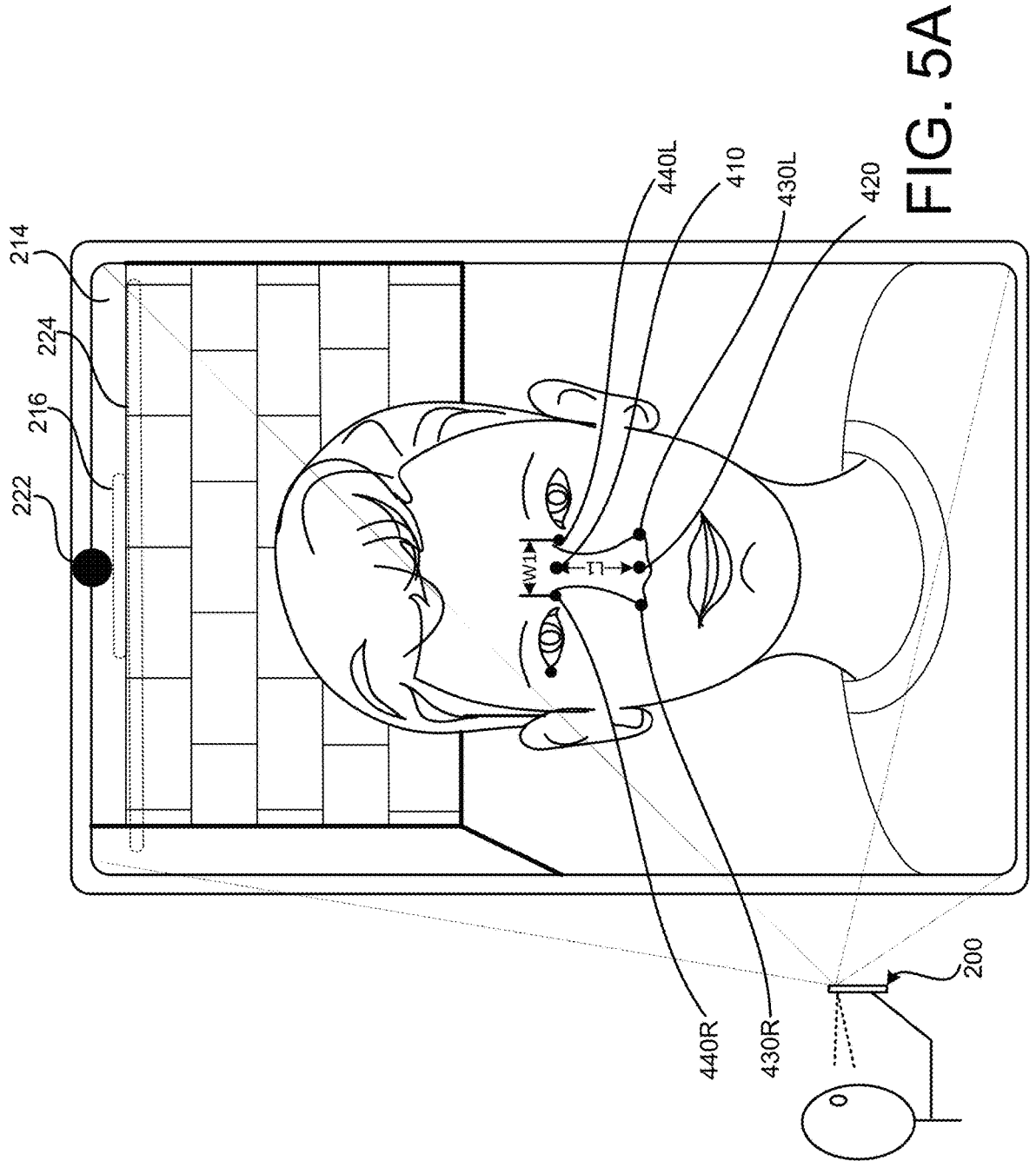
FIGS. 5A-5J illustrate example image data capture using an example computing device.

In the example shown in FIG. 5A, the user has initiated the capture of image data for example, via an application executing on the example handheld computing device 200. In FIG. 5A, the computing device 200 is positioned so that the head and face of the user is captured within the field of view of the image sensor 222. In the example shown in FIG. 5A, the image sensor 222 is included in the front facing camera of the computing device 200, and the head and face of the user are captured within the field of view of the front facing camera of the computing device 200. In the initial position shown in FIG. 5A, the computing device 200 is positioned substantially straight out from the head and face of the user, somewhat horizontally and vertically aligned with the head and face of the user, simply for purposes of discussion and illustration. The capture of image data by the image sensor 222 of the computing device 200 can be initiated at other positions of the computing device 200 relative to the head and face of the user.

Figure 5B:
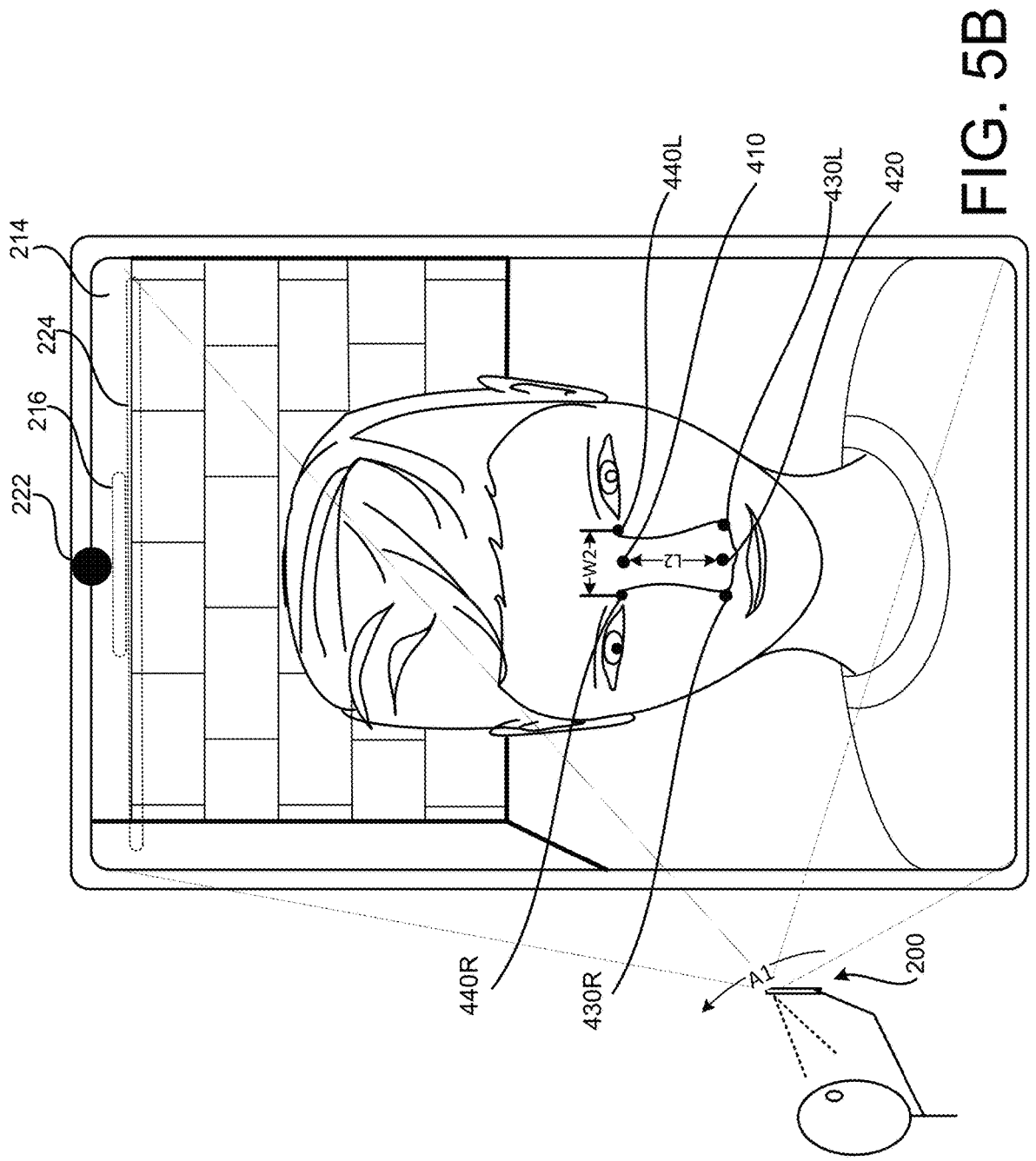
Figure 5C:
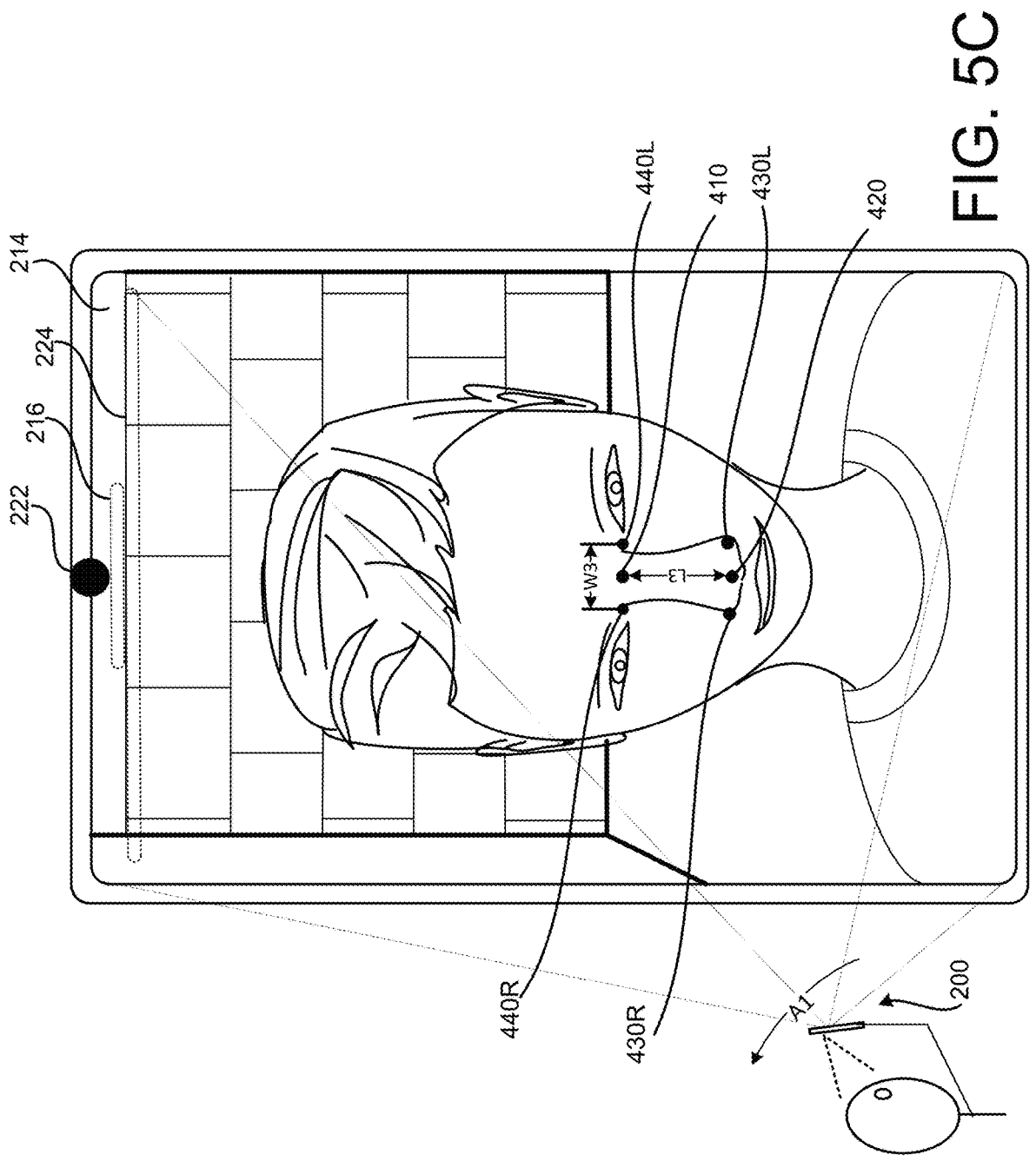

In the positions shown in FIGS. 5B and 5C, the user has moved, for example, sequentially moved, the computing device 200 in the direction of the arrow A1. In the positions shown in FIGS. 5B and 5C, the head and face of the user remain in substantially the same position as shown in FIG. 5A. As the computing device 200 is moved from the position shown in FIG. 5A to the position shown in FIG. 5B and then to the position shown in FIG. 5C, the image sensor 222 captures, for example, sequentially captures, image data of the head and face of the user from the different positions and/or orientations of the computing device 200/image sensor 222 relative to the head and face of the user. FIGS. 5B and 5C show just two example image frames captured by the image sensor 222 as the user moves the computing device 200 in the direction of the arrow A1, while the head and face of the user remain substantially stationary. Any number of image frames may be captured by the image sensor 222 as the computing device 200 is moved in the direction of the arrow A1. Similarly, any number of image frames captured by the image sensor 222 may be analyzed and processed by the recognition engine to detect and/or identify the example landmark 410 and/or the example landmark 420 the example landmarks 430 and/or the example landmarks 440 in the frames of image data captured as the computing device 200 is moved in this manner.

In FIGS. 5D-5G, the computing device 200 has been moved, for example, sequentially moved, in the direction of the arrow A2. In this example, as the computing device 200 is moved in the direction of the arrow A2, the head of the user remains in substantially the same position. As the computing device 200 is moved in the direction of the arrow A2, the image sensor 222 captures image data of the head and face of the user from corresponding perspectives of the computing device 200/image sensor 222 relative to the head and face of the user. Thus, as the computing device 200 is moved in the direction of the arrow A1, and then in the direction of the arrow A2, the image sensor 222 captures image data including the head and face of the user from the various different perspectives of the computing device 200/image sensor 222 relative to the head and face of the user. In this particular example, the position and/or orientation of the head and face of the user remain substantially the same. FIGS. 5D-5G show just some of the example frames of image data that may be captured by the image sensor 222 as the user moves the computing device 200 in the direction of the arrow A2. Any number of frames of image data may be captured by the image sensor 222 as the computing device 200 is moved in the direction of the arrow A2. Similarly, any number of frames of image data captured by the image sensor 222 may be analyzed and processed by the recognition engine to detect and/or identify the example landmark 410 and/or the example landmark 420 and/or the example landmarks 430 and/or the example landmarks 440 in the frames of image data captured as the computing device 200 is moved in this manner.

Figure 5D:
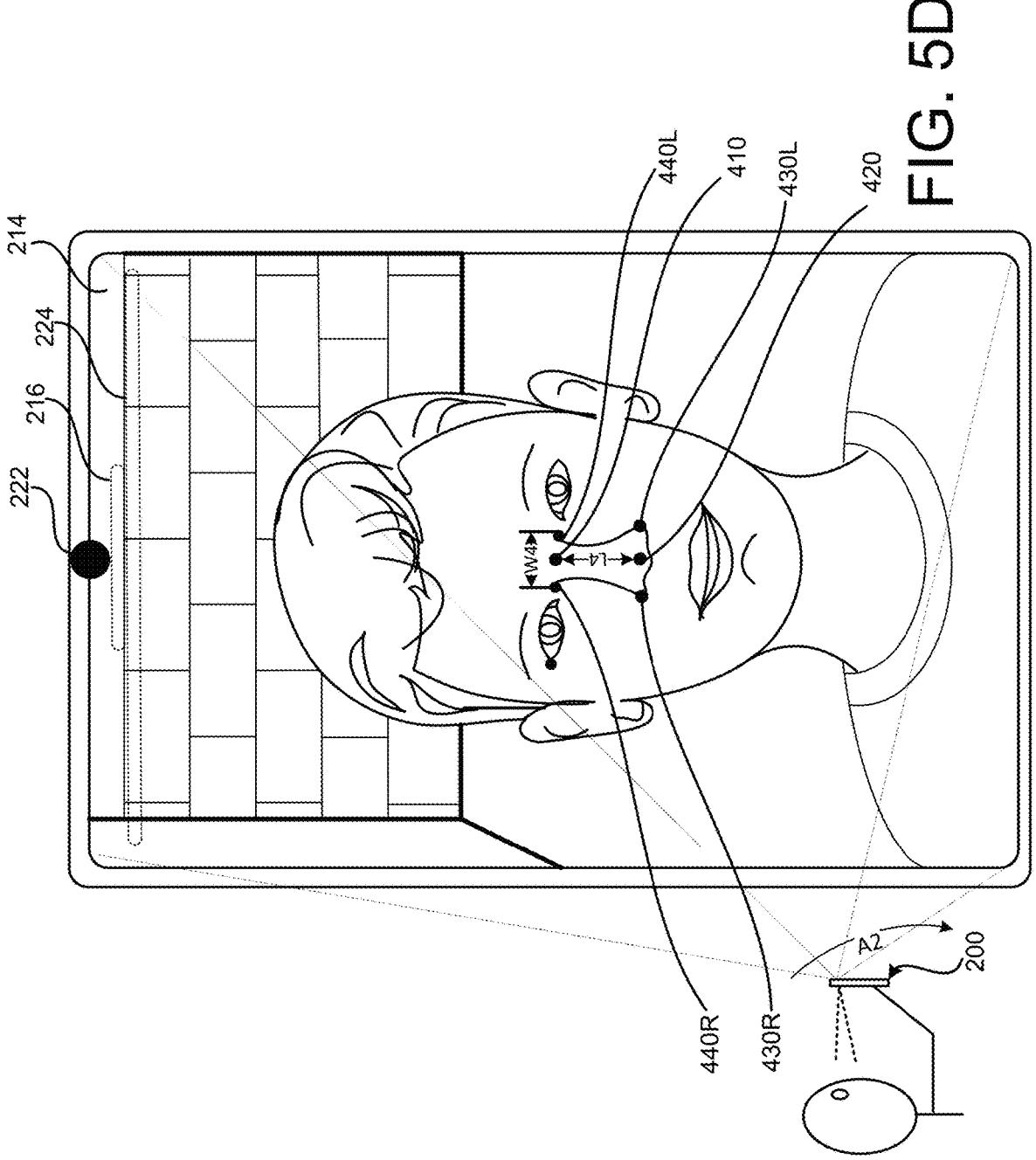
Figure 5E:
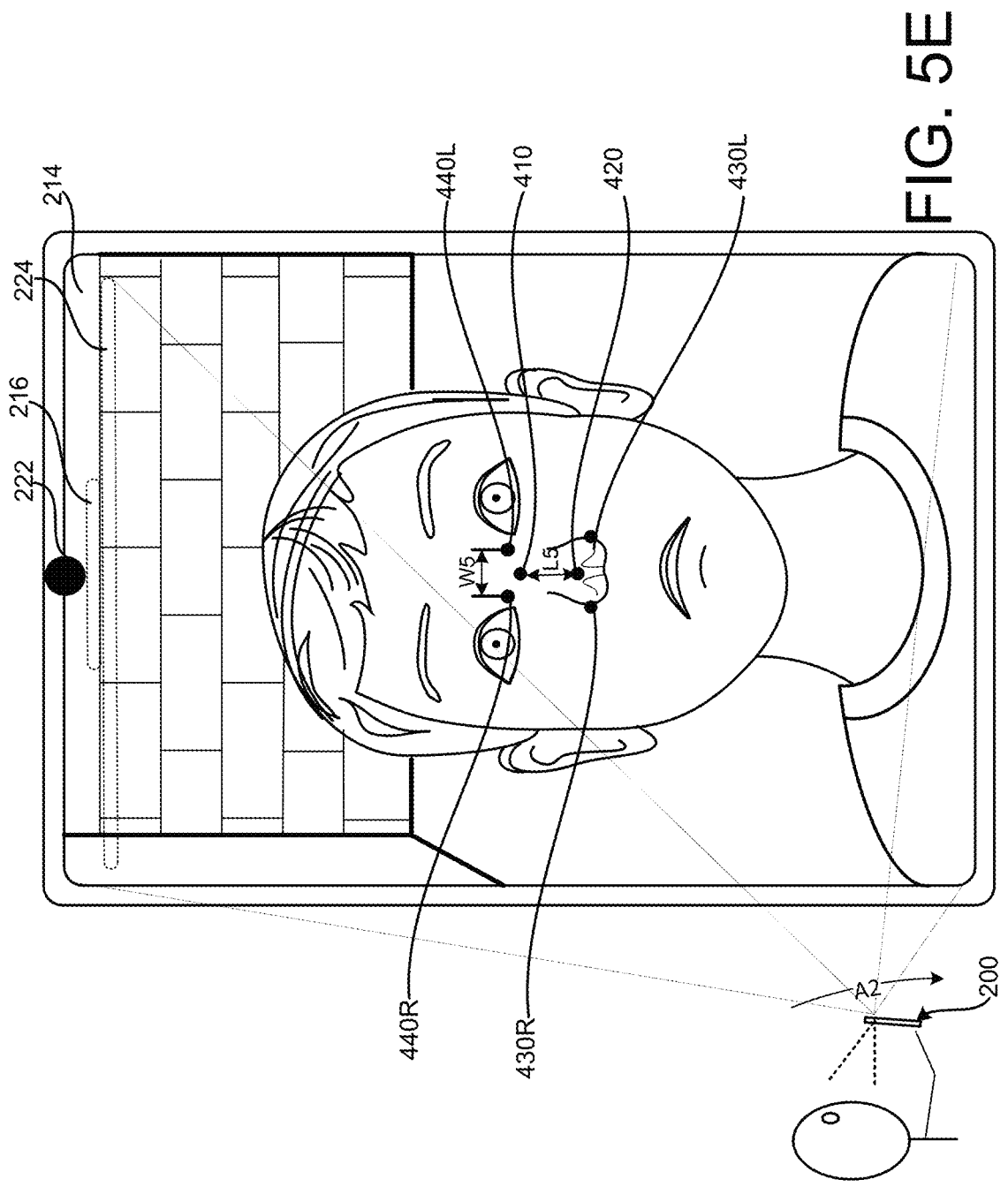
Figure 5F:
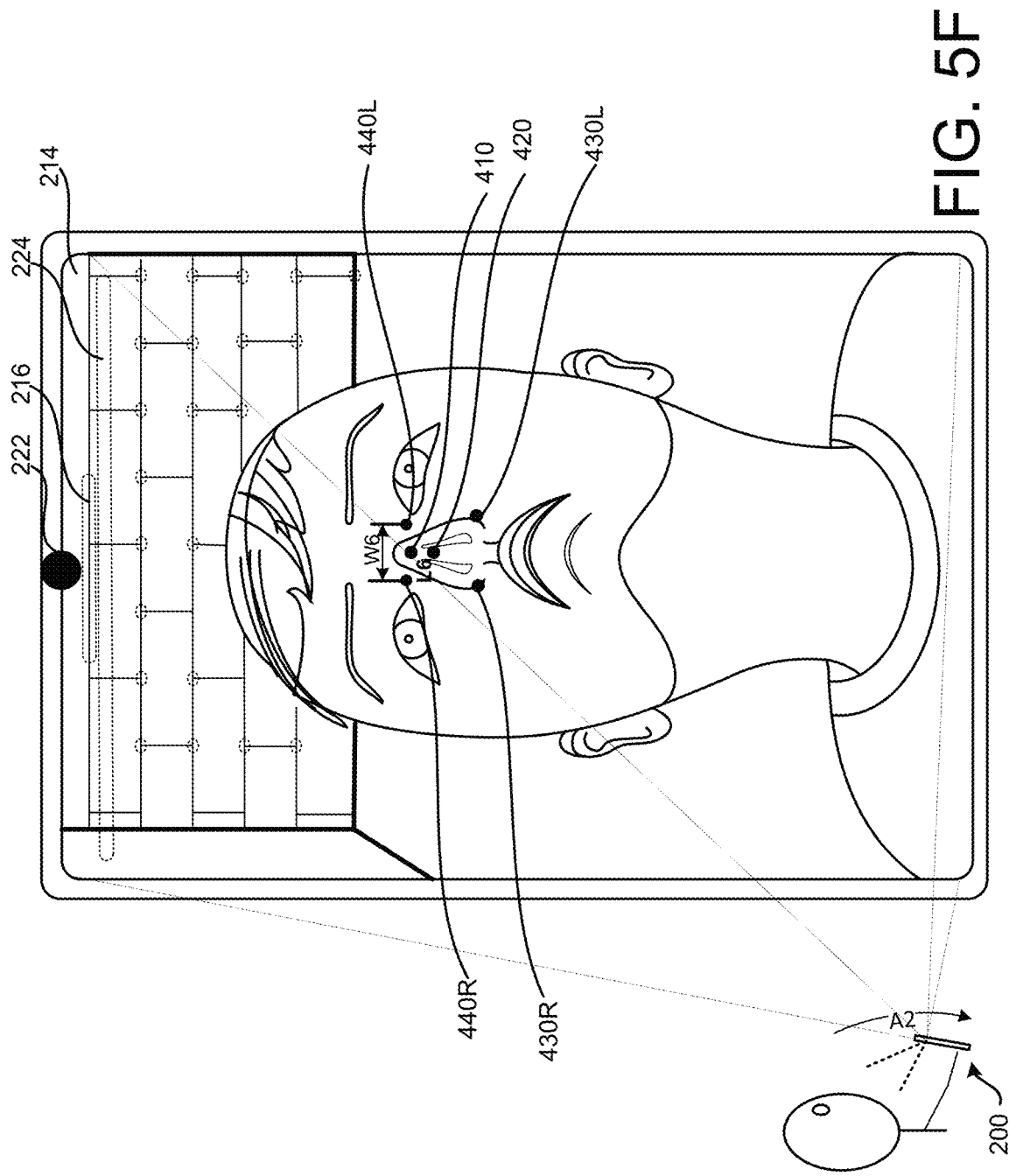
Figure 5G:
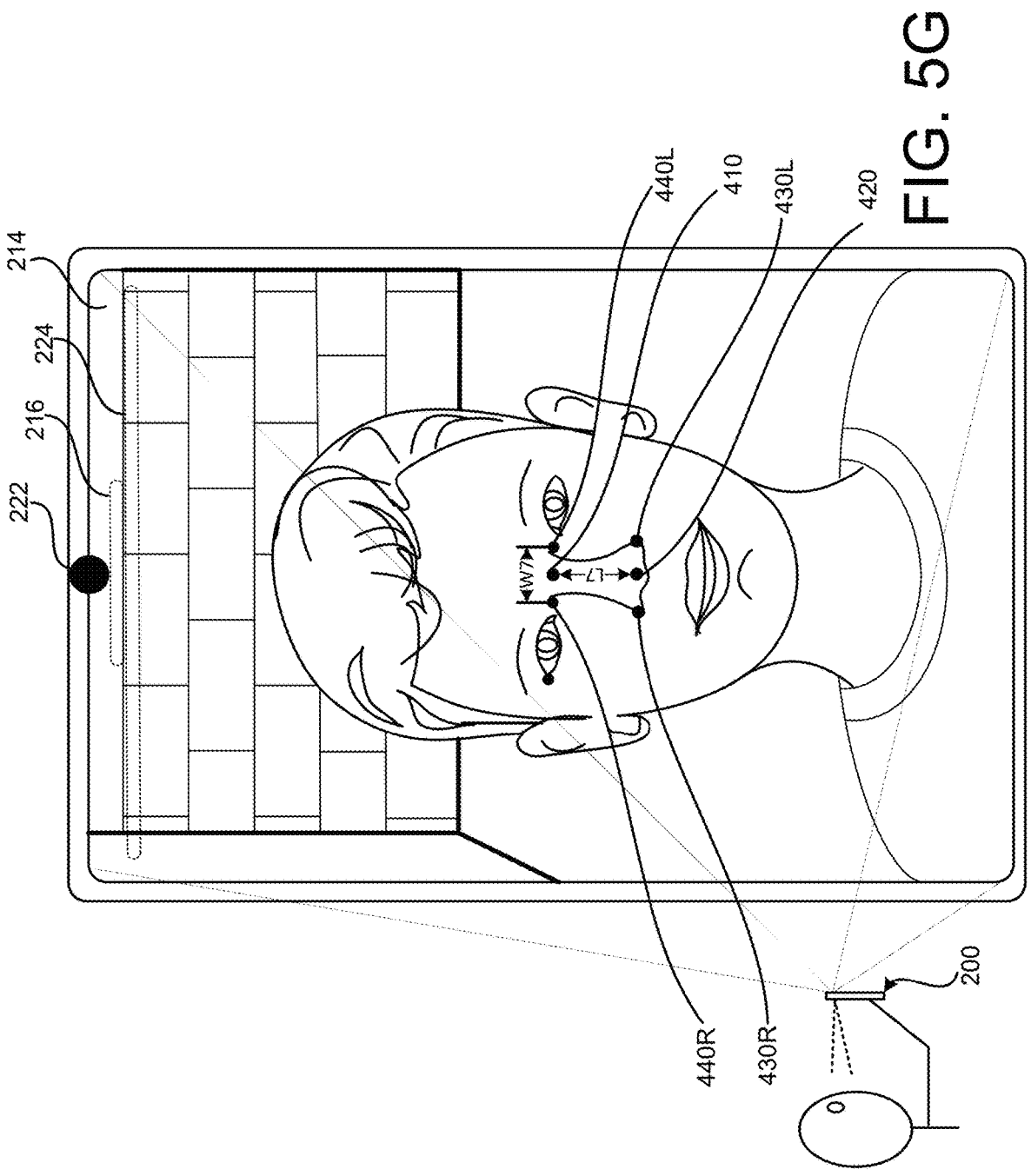
Figure 5H:
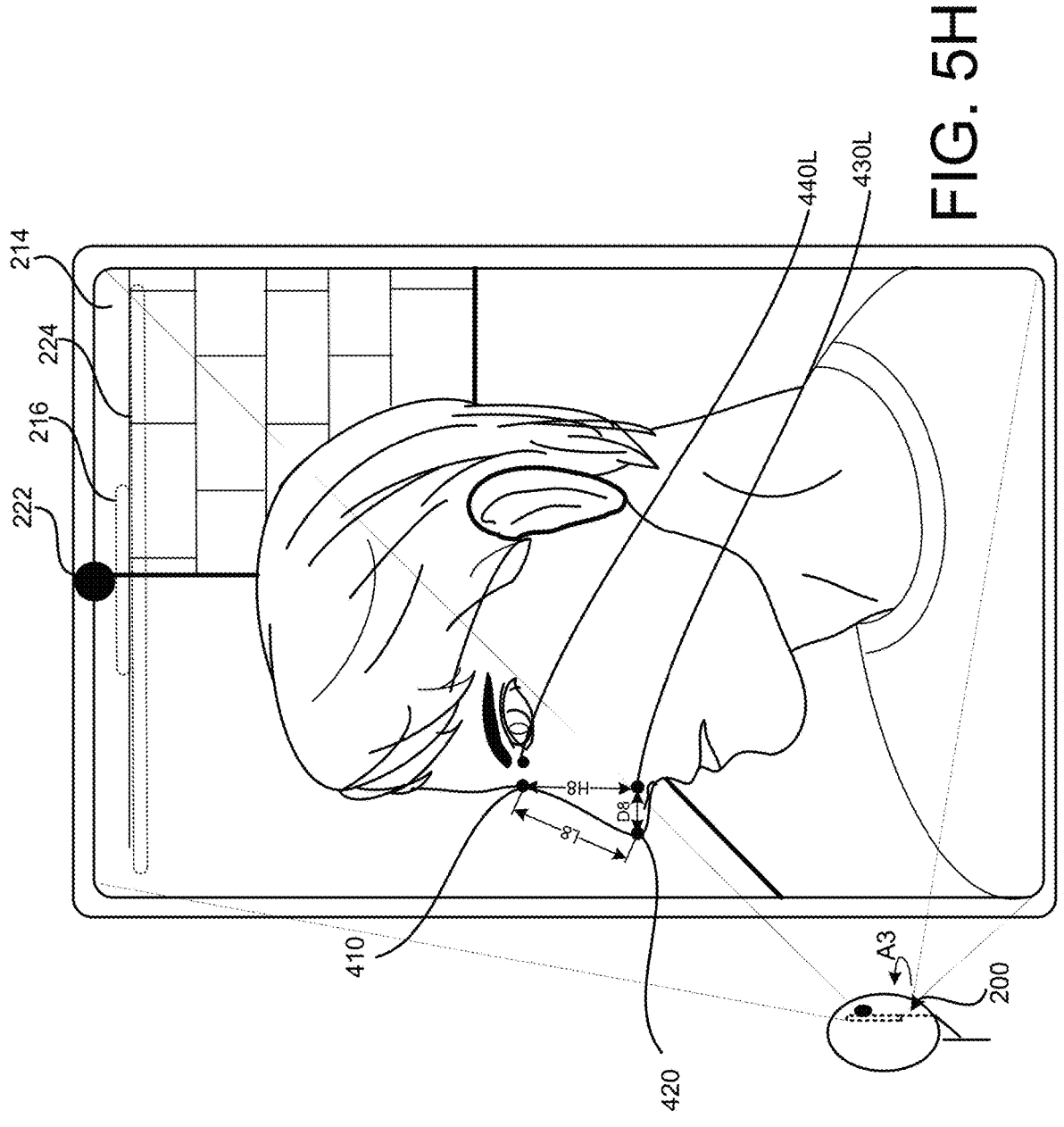

In the example shown in FIG. 5H, the user has moved the computing device 200, from the position shown in FIG. 5G (in which the computing device 200 is positioned substantially straight out from the head and face of the user, somewhat horizontally and vertically aligned with the head and face of the user) in the direction of the arrow A3. In this example, movement of the computing device 200 in the direction of the arrow A3 positions the computing device 200 at the left side of the user, capturing a profile image, or a series of profile perspectives, of the head and face of the user. In the position shown in FIG. 5H, the head and face of the user remain in substantially the same position as shown in FIG. 5G, simply for purposes of discussion and illustration. As the computing device 200 is moved from the position shown in FIG. 5G to the position shown in FIG. 5H, the image sensor 222 captures, for example, sequentially captures, image data of the head and face of the user, and in particular the nose of the user, from the different positions and/or orientations of the computing device 200/image sensor 222 relative to the head and face of the user. Any number of frames of image data may be captured by the image sensor 222 as the computing device 200 is moved in the direction of the arrow A3. Similarly, any number of image frames captured by the image sensor 222 may be analyzed and processed by the recognition engine to detect and/or identify the example landmark 410 and/or the example landmark 420 and/or the example landmarks 430 and/or the example landmarks 440 in the image frames captured as the computing device 200 is moved in this manner.

Figure 5I:
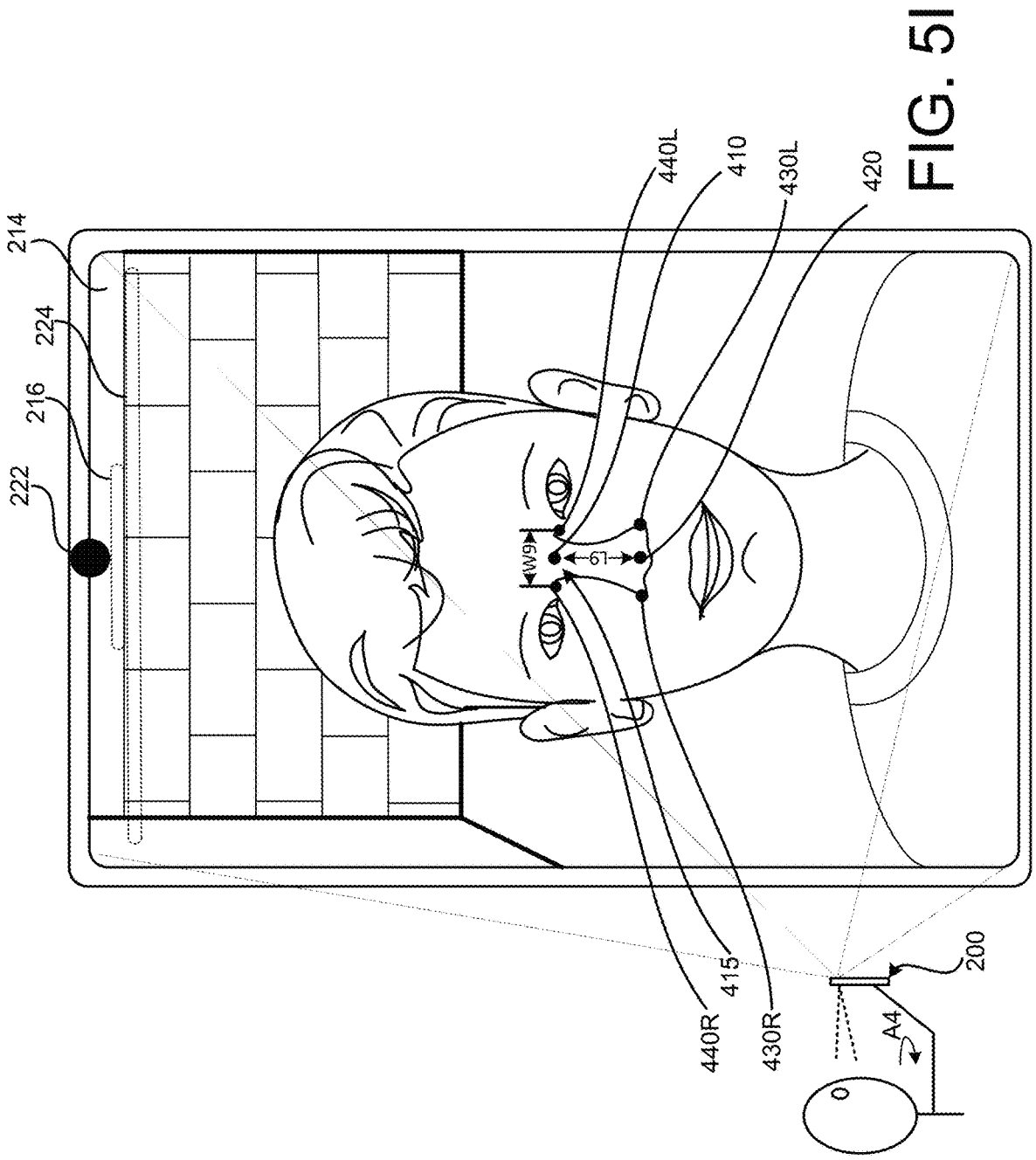
Figure 5J:
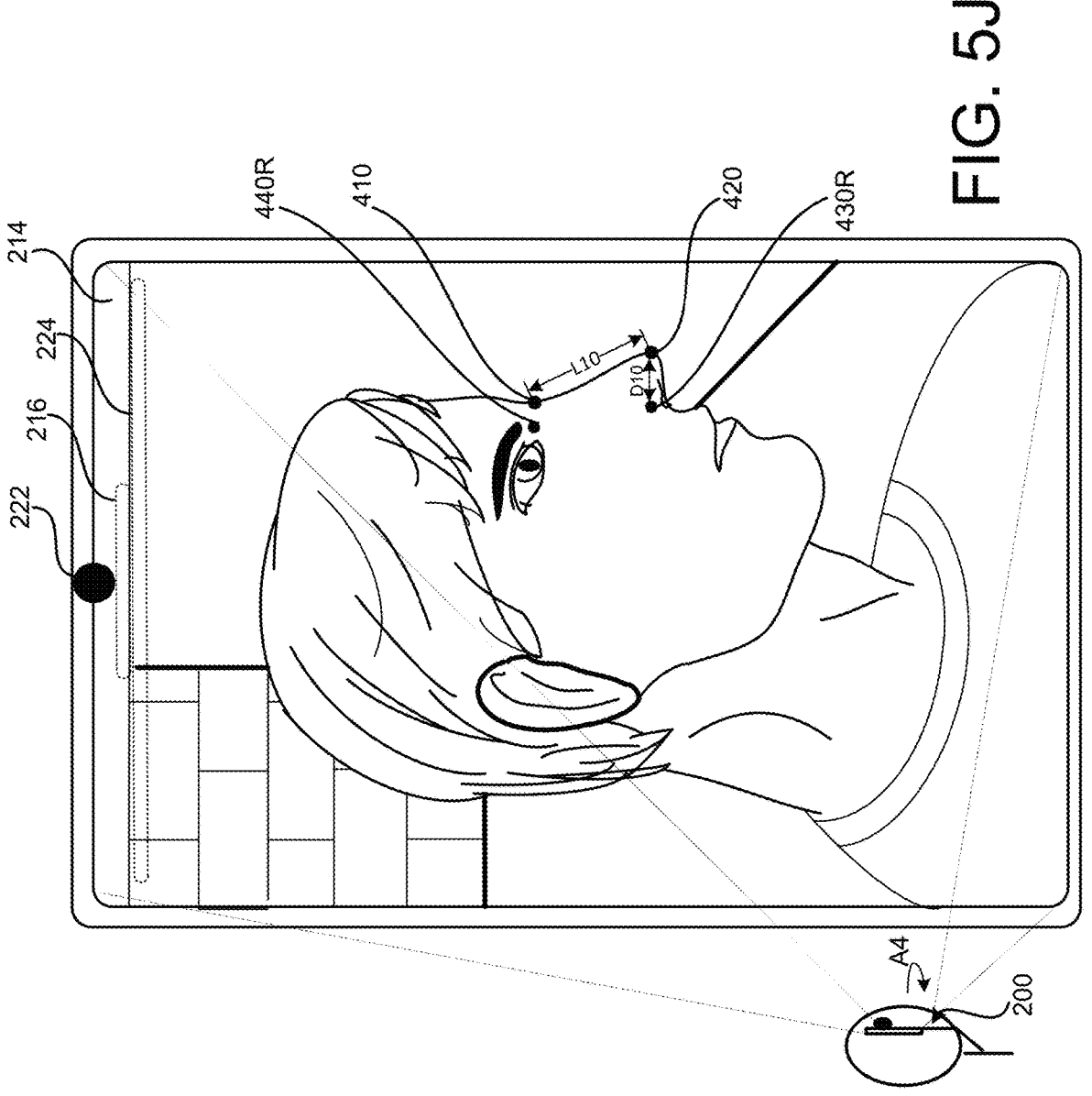

In FIGS. 5I and 5J, the computing device 200 has been moved, for example, sequentially moved, in the direction of the arrow A4, from the position shown in FIG. 5H. In this example, as the computing device 200 is moved in the direction of the arrow A4, the head of the user remains in substantially the same position. In this example, movement of the computing device 200 in the direction of the arrow A4 positions the computing device 200 at the right side of the user, capturing a profile image, or a series of profile images, of the head and face of the user. As the computing device 200 is moved in the direction of the arrow A4, the image sensor 222 captures image data of the head and face of the user, and in particular, the nose of the user, from corresponding perspectives of the computing device 200/image sensor 222 relative to the head and face of the user. Thus, as the computing device 200 is moved in the direction of the arrow A3, and then in the direction of the arrow A4, the image sensor 222 captures image data including the head and face of the user, and in particular, the nose of the user, from the various different perspectives of the computing device 200/image sensor 222 relative to the head and face of the user. Any number of frames of image data may be captured by the image sensor 222 as the computing device 200 is moved in the direction of the arrow A3 and the arrow A4. Similarly, any number of frames of image data captured by the image sensor 222 may be analyzed and processed by the recognition engine to detect and/or identify the example landmark 410 and/or the example landmark 420 and/or the example landmarks 430 and/or the example landmarks 440 in the frames of image data captured as the computing device 200 is moved in this manner.

The image data captured by the image sensor 222 of the computing device 200 as the computing device 200 is moved as shown in FIGS. 5A-5J may be processed, for example, by a recognition engine accessible to the computing device 200 (for example, via external computing systems of the additional resources 302 described above with respect to FIG. 3). Landmarks and/or features and/or key points and/or elements may be detected in the image data captured by the image sensor 222 through the processing of the image data. In this example, the example landmarks 410, 420, 430 and 440, and measures associated therewith, illustrate just some example landmarks and/or elements that may be detected in the frames of image data captured by the image sensor 222.

As noted above, one example feature or measure may include the nose width W, between the landmarks 440R, 440L, representing a width of the nose, at the root end portion 415 of the nose, where the bridge portion 129 of the head mounted wearable device 100 would be seated when worn by the user. Another example feature or measure may include the height H of the nose, representing a distance between the landmark 410 and the landmark 430R and/or between the landmark 410 and the landmark 430L. Another example feature or measure may include the depth D of the nose, representing a distance between the landmark 420 and the landmark 430R, and/or between the landmark 420 and the landmark 430L. As noted above, a slope S may be determined by dividing the nose height H by the nose depth D. The slope S may be representative of a slope of the dorsum, or nasal ridge 425 of the nose.

In some examples, data provided by the position and/or orientation sensors included in the IMU 224, together with the processing and analysis of the image data, may be used to provide the user with feedback, to provide for improved image data capture. In some examples, one or more prompts may be output to the user. These prompts may include, for example, a prompt indicating that the user repeat the image data collection sequence. These prompts may include, for example, a prompt providing further instruction as to the user's motion of the computing device 200 during the image data collection sequence. These types of prompts may provide for the collection of image data from a different perspective that may provide a more complete representation of the head and/or face of the user. These prompts may include, for example, a prompt indicating that a change in the ambient environment may produce improved results such as, for example, a change to include fixed features in the background, a change in illumination of the ambient environment, and the like. In some examples, the prompts may be visual prompts output on the display portion 214 of the computing device 200. In some examples, the prompts may be audible prompts output by the audio output device 216 of the computing device 200.

Image data collected in this manner, and/or the fixed landmarks and/or fixed elements detected in the image data, and/or the features of measures associated with the fixed landmarks and/or fixed elements, combined with data provided by position and/or orientation sensors included in the IMU 224 of the computing device 200, may be processed by the one or more processors of the additional resources 302 accessible to the computing device 200 to predict fit of a wearable device, such as the example head mounted wearable device 100.

In some examples, the fixed landmarks and/or fixed features detected in the image data and/or associated features and/or measures, alone or in combination with the position/orientation data associated with the computing device 200, may be used to extract depth/develop a depth map. In this example, the fixed landmarks and/or fixed elements detected in the image data, combined with data provided by position and/or orientation sensors included in the IMU 224 of the computing device 200, may be processed by the one or more processors of the additional resources 302 accessible to the computing device 200 to develop one or more depth maps of the nose of the user. In some examples, the depth map(s) may be processed by the one or more processors of the additional resources 302 to develop a three-dimensional mesh, or a three-dimensional model, of the nose of the user. A simulation module, or a simulation engine, may process the three-dimensional mesh, or three-dimensional model, of the nose of the user to fit the head mounted wearable device 100 on the three-dimensional mesh or model, and predict fit of the head mounted wearable device 100 on the user.

In some examples, a metric scale may be applied to determine one or more facial and/or cranial and/or ophthalmic measurements associated with the detected landmarks and/or features (for example, nose width N and/or nose length L and/or nose height H and/or nose depth D and/or interpupillary distance IPD, and the like, as described in the example above, and/or other such measures). The determined one or more facial and/or cranial and/or ophthalmic measurements may be processed by, for example, a machine learning algorithm, to predict fit of the head mounted wearable device 100 on the user. In some examples, metric scale may be provided by, for example, an object having a known scale captured in the image data, by entry of scale parameters by the user, and the like. In some examples, in which metric scale is not otherwise provided, the data associated with the detected landmarks and/or features and/or elements and the position and/or orientation data associated with the computing device 200 may be aggregated by algorithms executed by the one or more processors to determine scale.

The image data captured in the manner described above, when processed by one or more fitting and/or sizing and/or simulation engines and/or modules, may provide for the prediction of fit of a wearable device, such as the head mounted wearable device 100 described above, using the computing device 200 operated by the user, without the use of specialized equipment such as a depth sensor, a pupilometer and the like, without the use of a reference object having a known scale, without access to a retail establishment, and without a proctor to supervise the capture of the image data and/or to capture the image data. Rather, the image data may be captured by the image sensor 222 of the computing device 200 operated by the user, and in particular, by the image sensor 222 included in the front facing camera of the computing device 200.

As noted above, in some examples, one or more depth maps of the nose of the user may be generated based on a series of image frames including image data captured from different positions of the computing device 200 relative to the head and/or face of the user. The fixed landmarks and/or features and/or elements detected in the image data obtained in this manner may be tracked, and correlated with data provided by position and/or orientation sensors included in the IMU 224 of the computing device 200 to generate the one or more depth maps. In some examples, depth maps generated in this manner may be fused to generate a three-dimensional mesh, or a three-dimensional model, of the nose of the user.

In some examples, the frames of image data collected in this manner may be analyzed and processed, for example, by object and/or pattern recognition engines provided in the additional resources 302 accessible to the computing device 200, to detect the fixed landmarks and/or elements in the sequentially captured frames of image data. Data provided by the position and/or orientation sensors of the IMU 224 may be associated with the detected landmarks and/or elements in the sequential frames of image data. In some examples, changes in the measures associated with the fixed landmarks and/or elements, from image frame to image frame as the position and/or orientation of the computing device relative to the head/face of the user is changed and the sequential image frames are captured, may be associated with the data provisioned by the position and/or orientation sensors of the IMU 224.

This combined data may be aggregated, for example, by one or more algorithms applied by a data aggregating engine of the additional resources 302, to develop the one or more associated depth maps. In some examples, the depth map(s) may be fused to generate the three-dimensional mesh or model. In this example, the depth map(s) are fused to generate a three-dimensional mesh or model of the nose of the user. In an example in which metric scale is not otherwise provided, the data aggregating engine may aggregate this data to associate changes in pixel distance (based on analysis of the sequential frames of image data) with changes in position/orientation data of the computing device 200 to generate an estimate of metric scale.

For example, a head nose width W1 (based on the landmarks 440R, 440L), and a nose length NL1 (based on the landmarks 410, 420), are associated with the first position shown in FIG. 5A. A first position and a first orientation may be associated with the computing device 200, corresponding to the first position shown in FIG. 5A, based on data provided by the IMU 224. The position and orientation of the computing device 200 at the first position shown in FIG. 5A may in turn be associated with the landmarks 440R, 440L and the associated W1, and the landmarks 410, 420 and the associated L1.

As the computing device is moved from the first position shown in FIG. 5A to the second position shown in FIG. 5B, a second position and a second orientation of the computing device 200 are associated with the computing device 200 based on data provided by the IMU 224. A motion stereo baseline can be determined based on the first position and first orientation, and the second position and second orientation of the computing device 200, together with the changes in position and/or orientation of the landmarks and/or elements and associated measures detected in the image data. As the computing device 200 is moved relative to the head and face of the user from the first position shown in FIG. 5A to the second position shown in FIG. 5B, the image data captured by the image sensor 222 changes, so that the respective positions of the landmarks 410, 420, 430R, 430L, 440R, 440L change within the frame of image data. This in turn causes a change from the W1' and L1 shown in FIG. 5A to the W2 and L2 shown in FIG. 5B.

In FIG. 5B, the relative second positions of the landmarks 410, 420, 430R, 430L, 440R, 440L (and corresponding distances W2 and L2) can be correlated with the corresponding movement of the computing device 200 from the first position and first orientation to the second position and second orientation. That is, the known change in position and orientation of the computing device 200, from the first position/orientation to the second position/orientation, may be correlated with a known amount of linear rotation (for example, based on gyroscope data from the IMU 224) and linear acceleration (for example, from accelerometer data from the IMU 224). Thus, the detected change in position of the landmarks 410, 420, 430R, 430L, 440R, 440L (and corresponding distances W2 and L2) may be determined, using the detected known change in position and orientation of the computing device 200 together with an associated scale value. This data may provide a first reference source for the development of a depth map for the corresponding portion of the head/face of the user captured in the corresponding image frames.

As the computing device 200 is moved from the second position shown in FIG. 5B to the third position shown in FIG. 5C, image data captured by the image sensor 222 changes, so that the respective positions of the landmarks 410, 420, 430R, 430L, 440R, 430L change, causing a change from the W2 and L2 shown in FIG. 5B to the W3 and L3 shown in FIG. 5C. The relative third positions of the landmarks 410, 420, 430R, 430L, 440R, 430L (and corresponding distances W3 and L3) can be correlated with the corresponding movement of the computing device 200 as described above to provide another reference source for the development of depth map(s) (as well as a reference source for scale, if scale is not otherwise provided and is to be determined).

Data may continue to be obtained as the user continues to move the computing device 200 in the direction of the arrow A2, as shown in FIGS. 5D-5G, from the third position and third orientation shown in FIG. 5C to an example fourth position/orientation shown in FIG. 5D, an example fifth position/orientation shown in FIG. 5E, an example sixth position/orientation shown in FIG. 5F, an example seventh position/orientation shown in FIG. 5G, an example eighth position/orientation shown in FIG. 5H, an example ninth position/orientation shown in FIG. 5I, and an example tenth position/orientation shown in FIG. 5J. As the computing device 200 is moved as shown in FIGS. 5D-fJ, image data captured by the image sensor 222 changes, so that the respective positions of the landmarks 410, 420, 430R, 430L, 440R, 440L change within the respective frames of image data. This in turn causes a sequential change from the W3 and L3 shown in FIG. 5C, to the W4/L4, W5/L5, W6/L6, W7/L7, L8, W9/L9, and L10 shown in FIGS. 5D-5G, respectively. Continued movement of the computing device 200 in the direction of the arrow A3 and then the arrow A4 also for detection of changes from the D8 and H8 shown in FIG. 5H to the D10 and H10 shown in FIG. 5J. As described above, a slope S8 of the nasal ridge 425 may be determined, corresponding to the nose height H8 and nose depth D8 shown in FIG. 5H. Similarly, a slope S10 of the nasal ridge 425 may be determined, corresponding to the nose height H10 and nose depth D10 shown in FIG. 5J.

The relative positions of the landmarks 410, 420, 430R, 430L, 440R, 440L (and corresponding distances) can again be correlated with the corresponding movement of the computing device 200, with known positions and orientations of the computing device 200 as the computing device 200 is moved as shown, based on a known amount of linear rotation (for example, based on gyroscope data from the IMU 224) and linear acceleration (for example, from accelerometer data from the IMU. This data may again, be processed by the one or more processors, to develop one or more depth maps corresponding to portions of the face/head of the user captured in the image data of the associated image frames. In this particular example, this data is processed by the one or more processors to develop one or more depth maps of the nose of the user, to facilitate the development of a three-dimensional mesh, or a three-dimensional model, of the nose of the user, for the prediction of fit of the head mounted wearable device 100.

The example shown in FIGS. 5A-5G describes a plurality of example data collection points, simply for ease of discussion and illustration. In some examples, image data and position and orientation data may be obtained at more, or fewer, points as the computing device 200 is moved. In some examples, image data and position and orientation data may be substantially continuously obtained, with corresponding depth data being substantially continuously determined. Depth data, detected in this manner, may be aggregated, for example, by a data aggregating engine and associated algorithms available via the additional resources 302 accessible to the computing device 200. The image data, and the associated position and orientation data, may continue to be collected until the aggregated data determined in this manner provides a relatively complete data set for the development of a three-dimensional mesh/three-dimensional model of the nose of the user. Similarly, in a situation in which metric scale is not otherwise provided, this motion stereo approach may be applied to the determination of scale.

FIGS. 5A-5G provide just one example of a manner in which the image data may be captured by a user operating the computing device 200, without the need for specialized equipment and/or proctoring and/or a physical or virtual appointment with a technician for assistance. Other types of computing devices may be used to obtain the image data, operated in manners other than described in the above example(s).

Figure 6A:
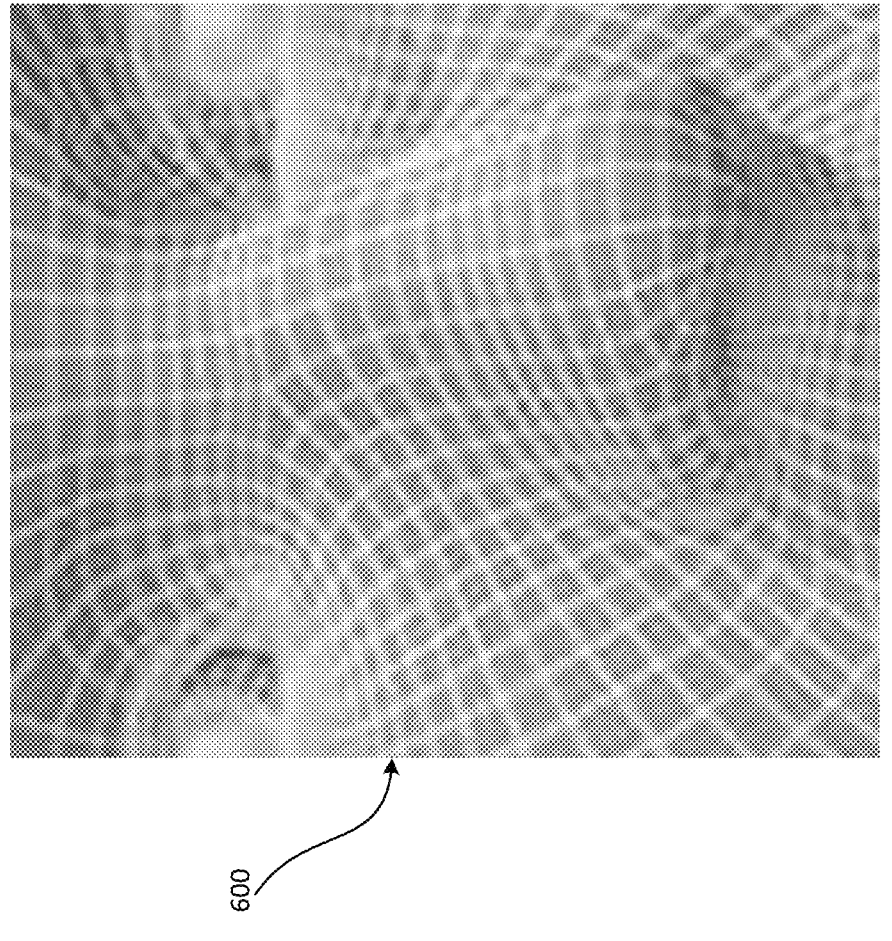
FIGS. 6A-6D illustrate example three-dimensional mesh models of a nose of a user generated from two-dimensional image data.
Figure 6B:
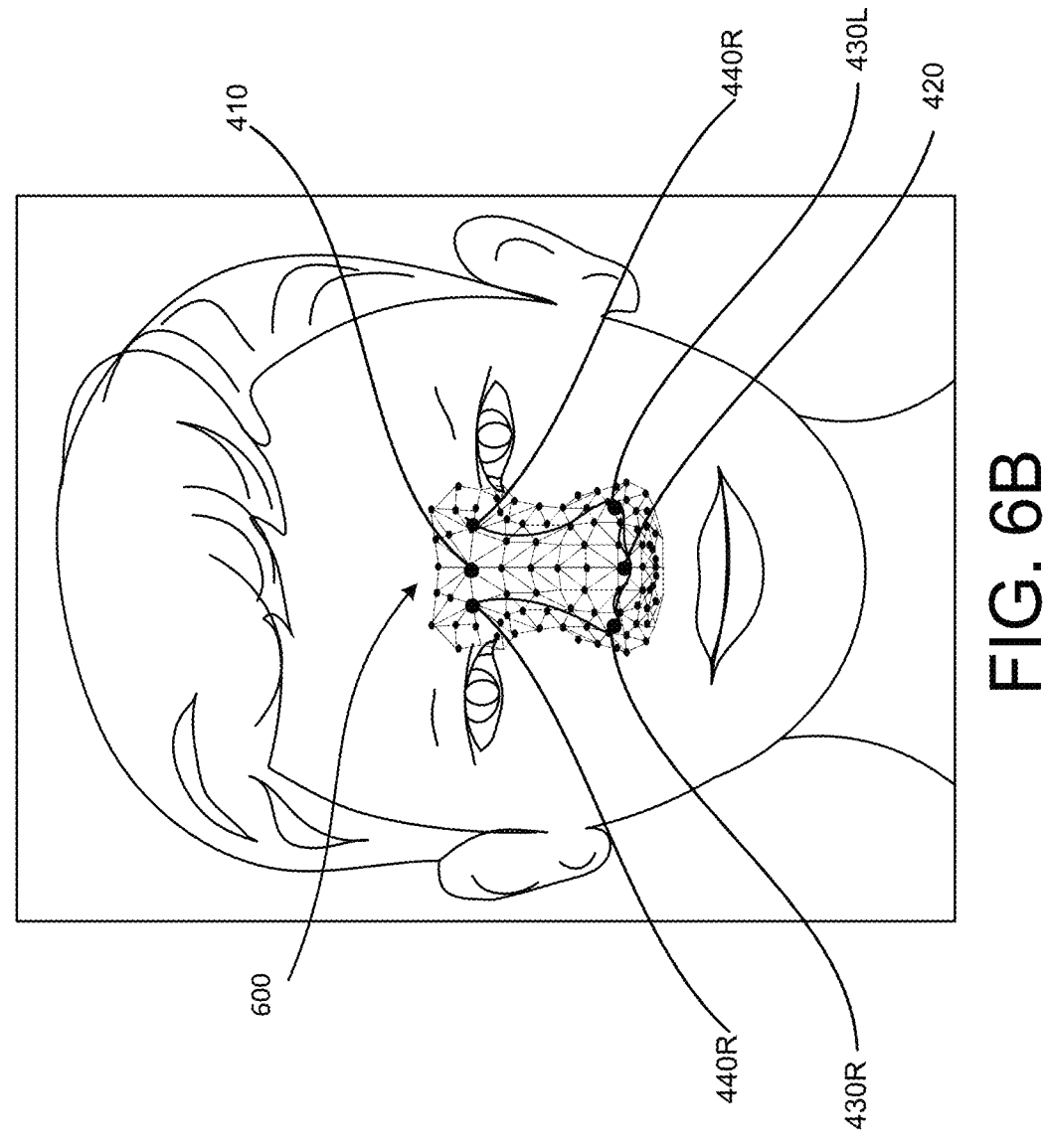

As noted above, the one or more depth maps may be generated from the image data captured in this manner, from various different perspectives/various different positions and/or orientations of the computing device 200 relative to the face and/or head, and in particular, the nose, of the user. In some examples, the depth maps may be fused, or stitched together, to develop a three-dimensional mesh, representative of a three-dimensional model, of the nose of the user. FIG. 6A illustrates a perspective view of an example three-dimensional mesh 600 of the nose of the user. The example three-dimensional mesh 600 may be generated based on a series of depth maps, developed from two-dimensional image data in a series of image frames as described above, that have been stitched or fused together to generate the three-dimensional mesh 600. FIG. 6B illustrates the three-dimensional mesh 600, superimposed on the nose of the user, including the identification of some of the example fixed facial landmarks.

In some examples, the three-dimensional mesh 600, or three-dimensional model, may be provided to a simulation engine or a simulation module, to predict a fit of the wearable device (i.e., the head mounted wearable device 100) for the user. In some examples, various metric measurements may be extracted from the three-dimensional mesh 600 for processing in predicting fit. In some examples, these measurements may include one or more of the example nose width W, slope S (determined from nose height H and nose depth D as described above), and/or other such measurements that can be derived based on the application of a known or determined metric scale to various fixed landmarks. In some examples, the various measurements may be used to predict various aspects of fit associated with the head mounted wearable device 100. In some examples, the processing of the three-dimensional mesh 600 or model may predict a wearable fit, representative of how the head mounted wearable device 100 will physically fit on the face/head of the user, based on how the various features in the bridge portion 129 and corresponding portions of the rim portions 123 of the head mounted wearable device 100 will fit on the nose of the user. These features (nose width W, slope S, and corresponding physical features of the frame 110 of the head mounted wearable device 100) may also be used to predict how the head mounted wearable device 100 will be seated on the nose of the user, to facilitate the prediction of ophthalmic fit and/or display fit. For example, in a situation in which the head mounted wearable device 100 is to include corrective or prescription lenses, the processing of these measurements and features, and determination of how the frame 110 will be worn by the user, may allow the fitting prediction to take into account ophthalmic measurements such as pantoscopic angle, providing for the prediction of ophthalmic fit. Similarly, in a situation in which the head mounted wearable device 100 is to include display capability, this processing and fitting prediction may take into account display fit, so that content output by a display device of the head mounted wearable device 100 is visible to the user.

Figure 6C:
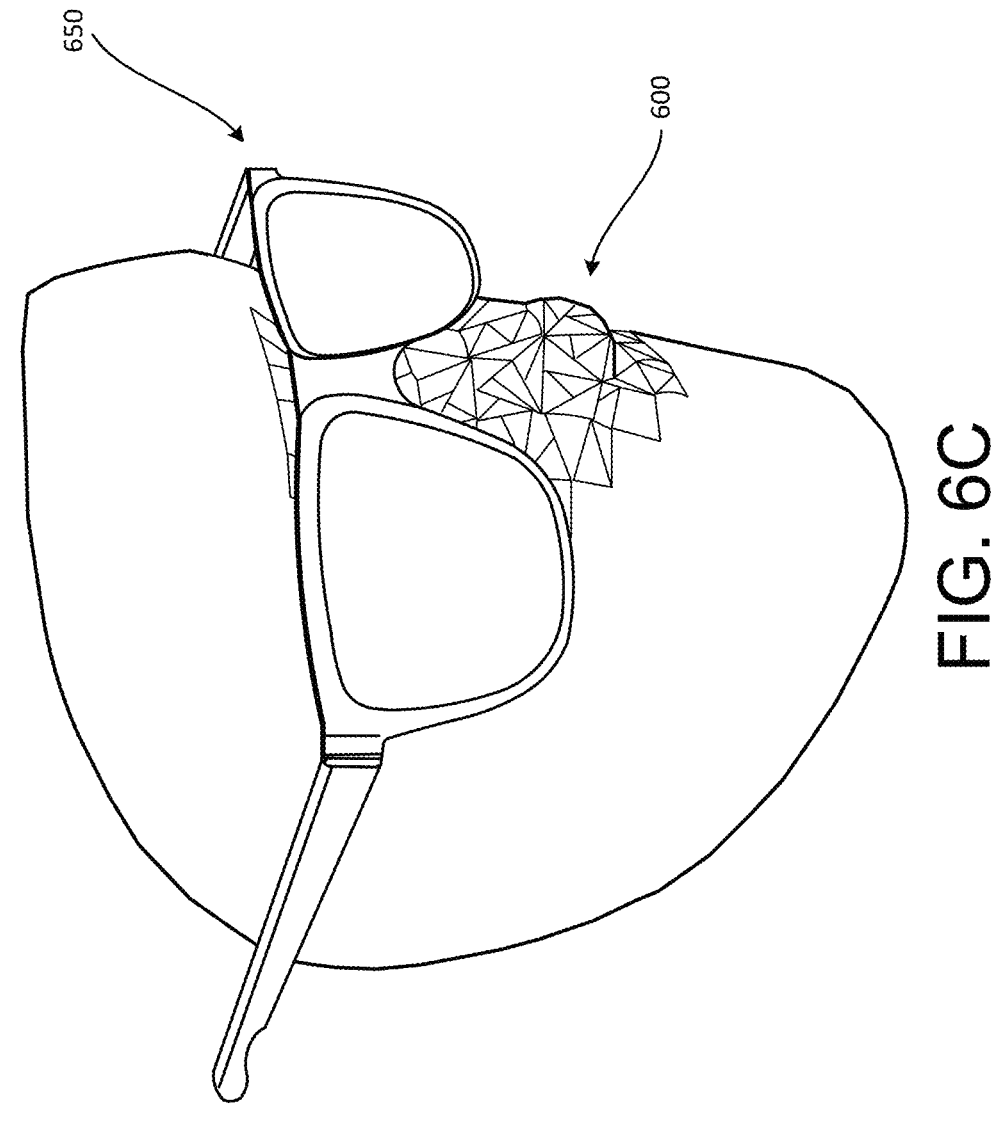
Figure 6D:
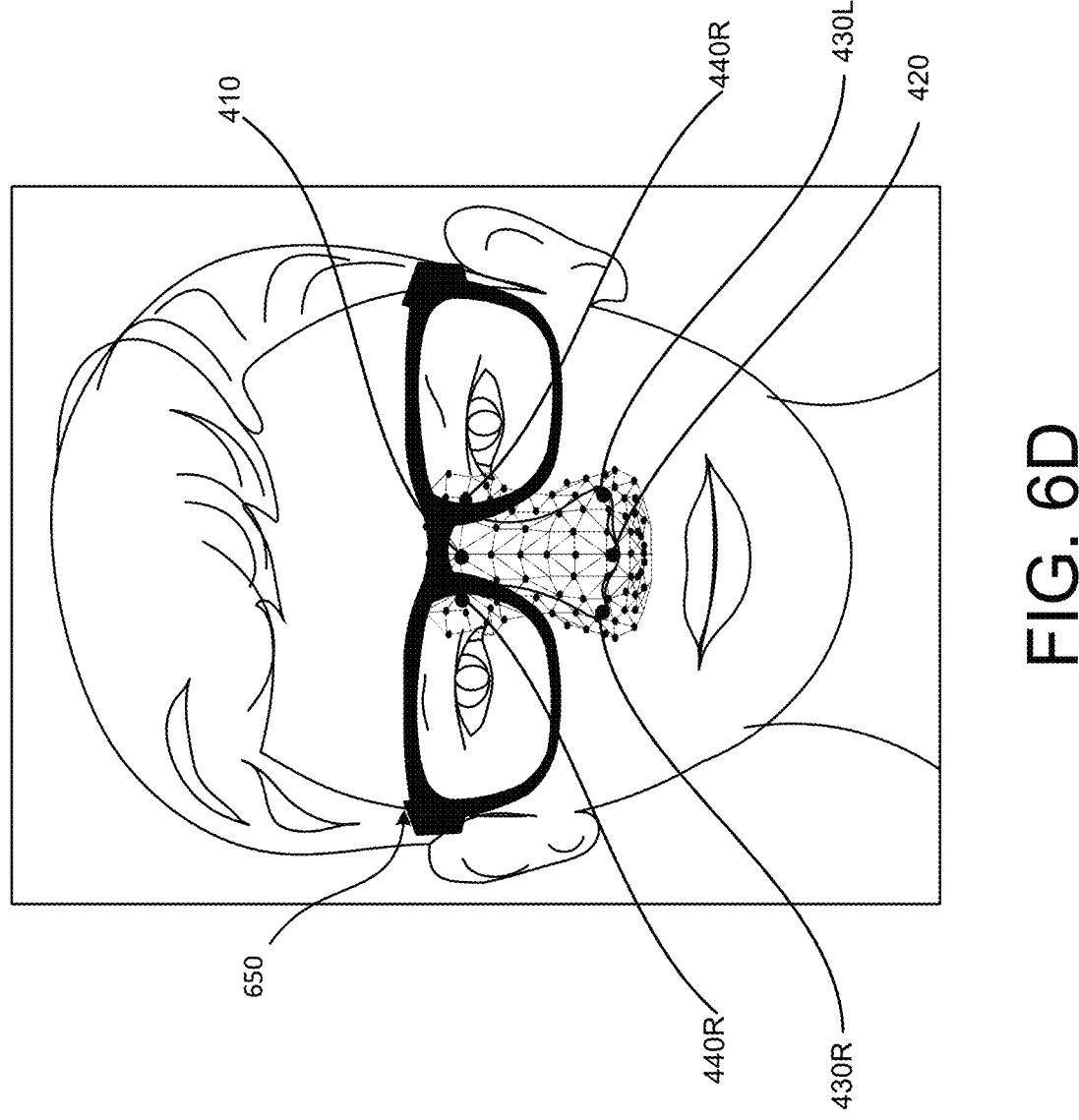

In some examples, the one or more measurements described above may be extracted, for example, from the three-dimensional mesh 600, to predict sizing and/or fitting of the head mounted wearable device 100 for the user based on the image data obtained as described above. In some examples, the three-dimensional mesh 600 and/or extracted measurements may be provided to a sizing and/or fitting simulator, or simulation engine, or simulation module. In some examples, the sizing and/or fitting simulator may access a database of available head mounted wearable devices and apply a machine learnings model to select one or more head mounted wearable devices, from the available head mounted wearable devices, that are predicted to fit the user based on the three-dimensional mesh 600 and/or the extracted measurements. FIG. 6C illustrates one example head mounted wearable device 650, of a plurality of head mounted wearable devices which may be considered by the simulator and/or the machine learning model, positioned on a model of the head/face of the user including the three-dimensional mesh 600 of the nose of the user. FIG. 6D illustrates an image of the example head mounted wearable device 650 superimposed on an image of the face of the user, with the three-dimensional mesh 600 superimposed on the nose of the user.

In some examples, the simulator may access a fit database including fit data for each of the plurality of available head mounted wearable devices. Fit scores, accumulated across a relatively large pool of users, may be accessed to provide an indication and prediction of fit for the user, based on one or more of the measurements extracted from the three-dimensional mesh 600. The database accessed by the machine learning model may include, for example, a distribution of scoring frequency for each of the plurality of available head mounted wearable devices for a range of nose widths, a range of nose slopes, and the like. These scores may be taken into consideration by the machine learning model in predicting fit for a head mounted wearable device for the user.

Figure 7:
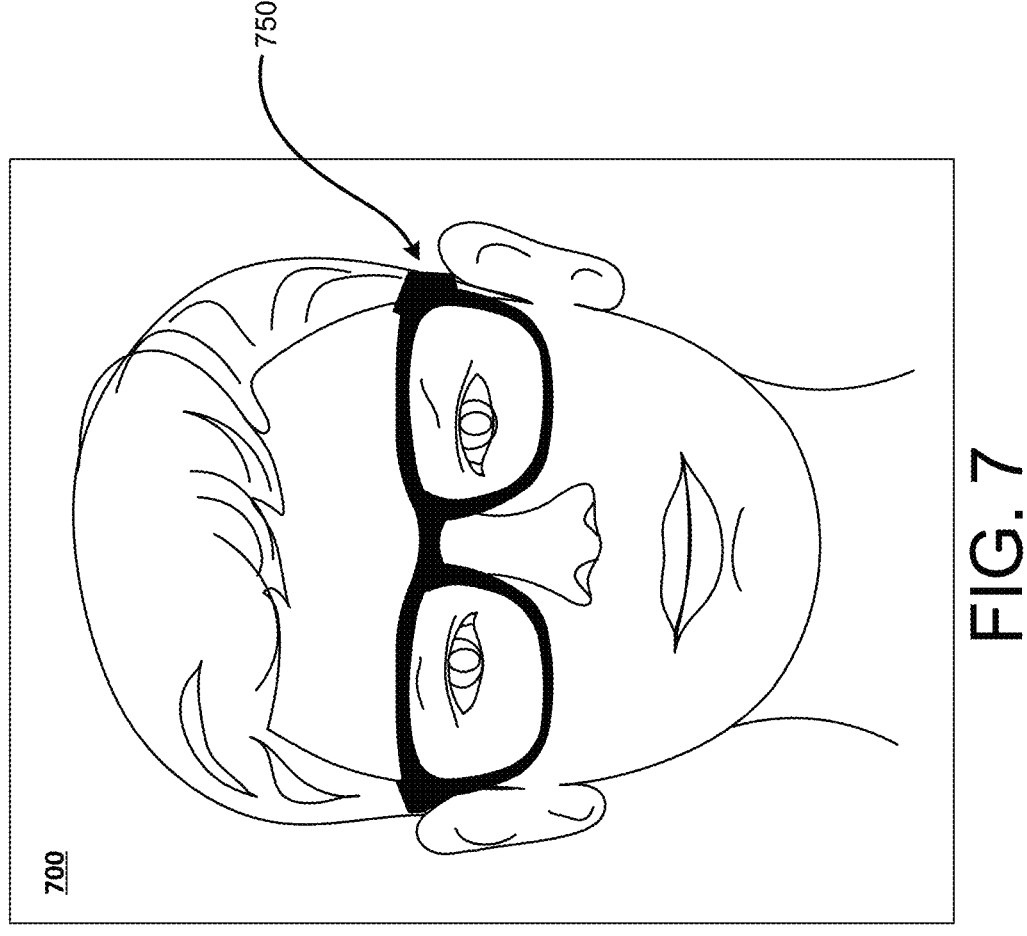
FIG. 7 illustrates an example fitting image.

In some examples, the one or more head mounted wearable devices, predicted by the simulator implementing the machine learning model to be a fit for the user, may be presented to the user, for virtual try on, comparison, and the like prior to purchase. In some examples, the simulator may predict whether a head mounted wearable that has already been selected by the user will fit the user. In some examples, the simulator may provide a fitting image 700 to the user, as shown in FIG. 7. The fitting image 700 may provide a visual indication during the virtual try on, representative of how a selected head mounted wearable device 750 will look on the face and/or head of the user.

As described above, in some implementations, pads 180 may be coupled to the rim portions 123 of the head mounted wearable device 100. In some examples, the pads 180 may be removably coupled to the rim portions 123. This may allow different sizes and/or shapes and/or configurations of pads 180 to be coupled to the rim portions rim portions 123 of the head mounted wearable device 100. The ability to customize a size and/or a shape and/or a configuration of pads 180 that are coupled to the rim portions 123 of the head mounted wearable device 100 may provide for adjustment of the fit of the head mounted wearable device 100. In some situations, this ability to adjust the fit using different sizes/shapes/configurations of pads 180 may expand the array of frames that will work for the user's particular sizing needs, and thus provide the user with a wider section of frames from which to choose. In some situations, this ability to adjust the fit using different sizes/shapes/configurations of pads 180 may provide for fine tuning of ophthalmic fit and/or display fit. In some situations, this ability to adjust the fit using different sizes/shapes/configurations of pads 180 may help to maintain a desired position and/or orientation of the frame of the head mounted wearable device 100 on the nose and/or face of the user. In some situations, this ability to adjust the fit using different sizes/shapes/configurations of pads 180 may improve comfort of the head mounted wearable device 100 when worn by the user. In some situations, this ability to adjust the fit using different sizes/shapes/configurations of pads 180 may improve an appearance of the head mounted wearable device 100 on the face of the user.

In some examples, the position of the nose bridge, at the root end portion 415 of the nose, and/or the height of the nose bridge, may provide an indication of how the head mounted wearable device head mounted wearable device 100 will be seated on the nose and/or how the head mounted wearable device 100 will be positioned on the face of the user. This may also provide an indication of whether or not some level of adjustment may improve the fit of the head mounted wearable device 100. Improvement in the fit of the head mounted wearable device 100 may include improvement in the physical fit, or wearable fit characteristics of the head mounted wearable device 100 and/or aesthetic fit characteristics of the head mounted wearable device 100. Improvement in the fit of the head mounted wearable device 100 may include improvement in the ophthalmic fit and/or display fit of the head mounted wearable device 100.

In some examples, systems and methods, in accordance with implementations described herein, may use the image data captured as described above, and/or the three-dimensional mesh 600, or model, developed from the image data, and/or the measurements extracted therefrom, to predict whether the addition of pads 180 will improve the fit (i.e., wearable fit and/or ophthalmic fit and/or display fit and/or aesthetic fit) of the head mounted wearable device 100. In some examples, the image data captured as described above, and/or the three-dimensional mesh 600 developed from the image data, and/or the measurements extracted therefrom, may be used to predict a size and/or a shape and/or a configuration of pads 180 that can be used to improve the fit (i.e., wearable fit and/or ophthalmic fit and/or display fit and/or aesthetic fit) of the head mounted wearable device 100. Assistance provided in this manner, as part of the virtual sizing and/or fitting and/or try on process, may reduce or substantially eliminate user frustration in selecting the size/shape/configuration of pads 180 for adjustment of the head mounted wearable device 100 after product receipt. Assistance provided in this manner, as part of the virtual sizing and/or fitting and/or try on process, may provide for addition of the correct pads 180 to the head mounted wearable device 100 to provide for the desired wearable fit and/or ophthalmic fit and/or display fit and/or aesthetic fit, rather than relying on user trial and error after product receipt. This may further enhance the frictionless sizing and/or fitting and/or adjustment of the head mounted wearable device 100 in a virtual manner.

Figures 8A, 8B, 8C:
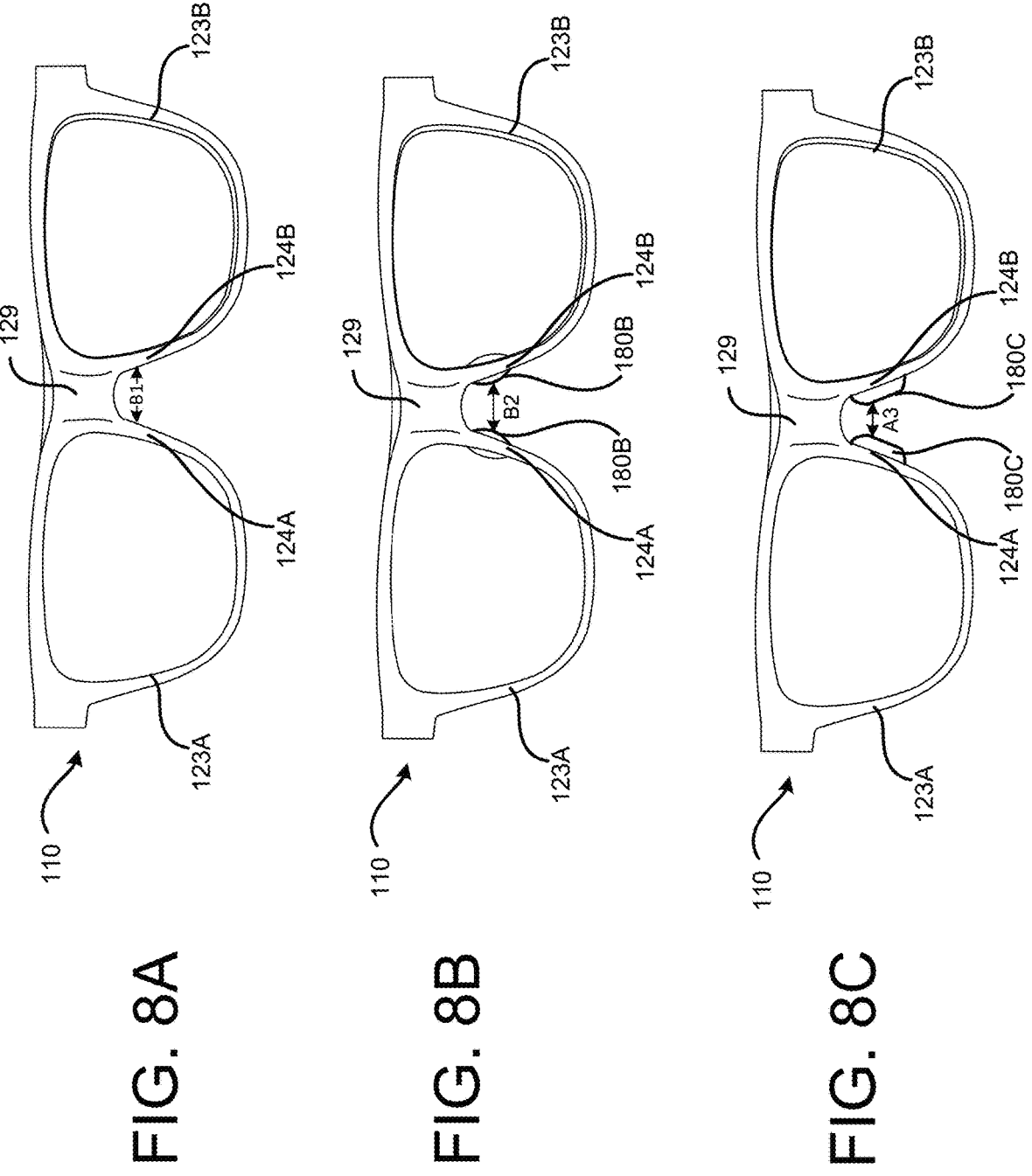
FIGS. 8A-8C are front views of example frame configurations including example pads.

FIGS. 8A-8C are front views of the example frame 110 of the example head mounted wearable device 100 shown in FIGS. 1A-1C.

FIG. 8A presents a first frame configuration 110A, without the use of pads 180. When the first frame configuration 110A is worn by the user, the bridge portion 129 would be seated on the bridge portion, at the root end portion 415 of the nose, with a contact portion 124A of the first (i.e., right, in the example arrangement shown in FIG. 8A) rim portion 123A seated on a first (i.e., right, in the example arrangement shown in FIG. 8A) side of the nose, and a contact portion 124B of the second (i.e., left, in the example arrangement shown in FIG. 8A) rim portion 123B seated on the second (i.e., left, in the example arrangement shown in FIG. 8A) side of the nose. A bridge distance B1 extends between the contact portion 124A of the first rim portion 123A and the contact portion 124B of the second rim portion 123B. The nose of the user may be accommodated in the area bounded by the bridge portion 129 and the contact portions 124A, 124B of the rim portions 123A, 123B.

Figure 9A:
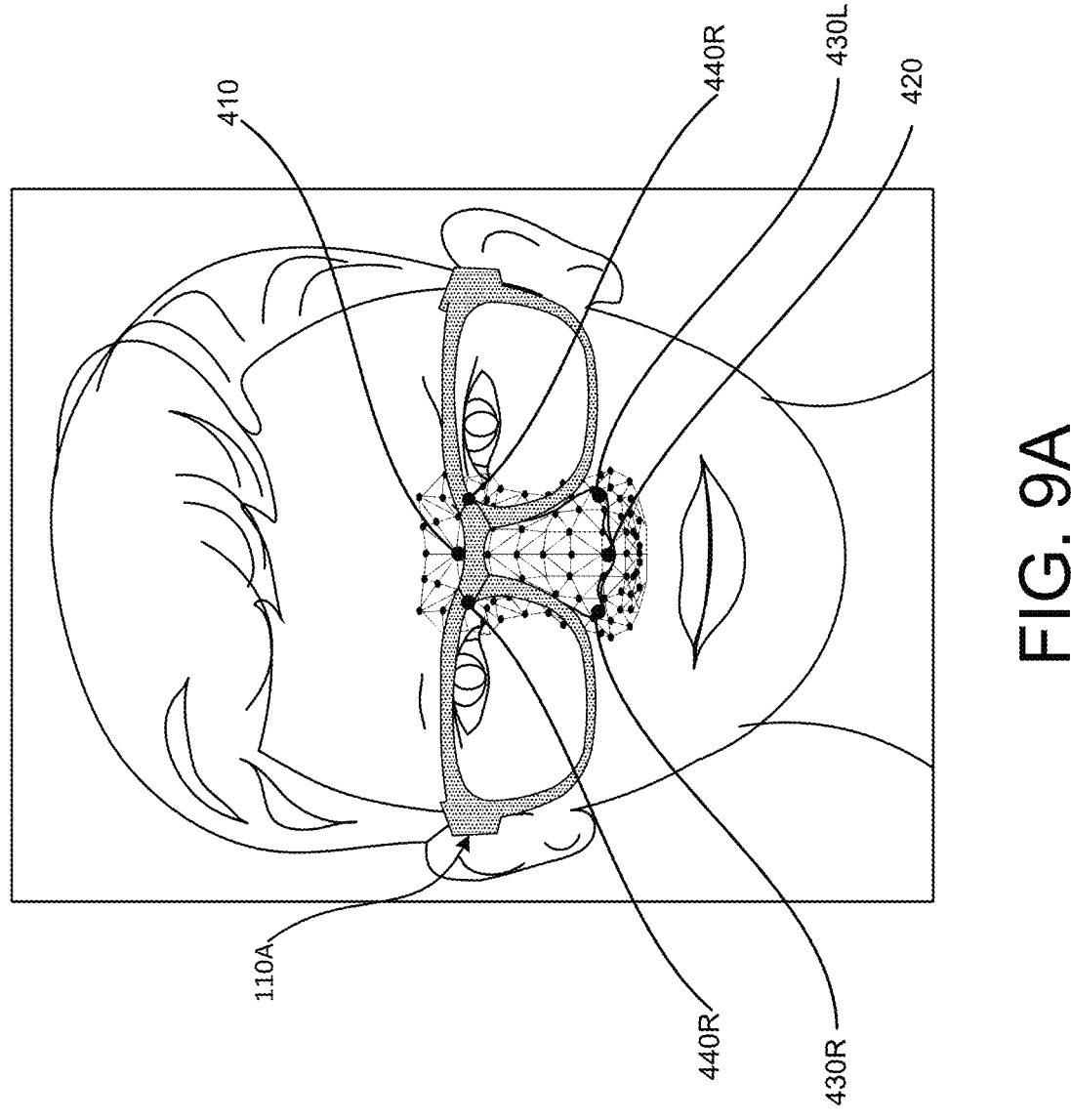
FIGS. 9A-9D illustrate the fitting of the example frame configurations shown in FIGS. 8A-8C.

FIG. 9A illustrates the first frame configuration 110A fitted on the user, superimposed on the three-dimensional mesh 600. It may be determined, based on the image data captured and processed as described above to generate the one or more depth maps and corresponding three-dimensional mesh, that the distance B1 between the contact portions 123A, 123B of the rim portions 123 is, for example, greater than the nose width W of the user. This would likely cause the bridge portion 129 of the head mounted wearable device 100 to be seated too far down on the nasal ridge, and some possible misalignment between the optical axes of the eyes of the user/the field of view of the user, and/or misalignment with the optical curvature of corrective lenses, and/or misalignment with the output coupler 105 of the display device 106. In some examples, the distance B1 between the contact portions 123A, 123B of the rim portions 123 may be adjusted through the addition of pads 180 on the rim portions 123. In some examples, the virtual sizing and/or fitting of the head mounted wearable device 100 as described above can include a prediction of fit based on the addition of pads 180 to adjust a fit of the frame 110 on the nose, and face, of the user, to adjust an orientation of the frame 110 on the nose, and face, of the user, and the like. The virtual sizing and/or fitting of the head mounted wearable device 100 can include a selection of one, of a plurality of different size and/or shape and/or configuration of pads, that will provide the desired sizing and/or fitting of the head mounted wearable device 100 for a particular user.

As shown in FIG. 9A, the first frame configuration 110A is seated somewhat lower than desired on the bridge of the nose, resulting in the misalignment described above. Accordingly, in some examples, the image data and resulting depth maps and/or three-dimensional mesh 600 and/or measurements extracted therefrom may be processed to select pads 180 which may be coupled to the rim portions 123 to provide for the desired position and/or orientation of the head mounted wearable device 100 when worn by the user.

Figure 9B:
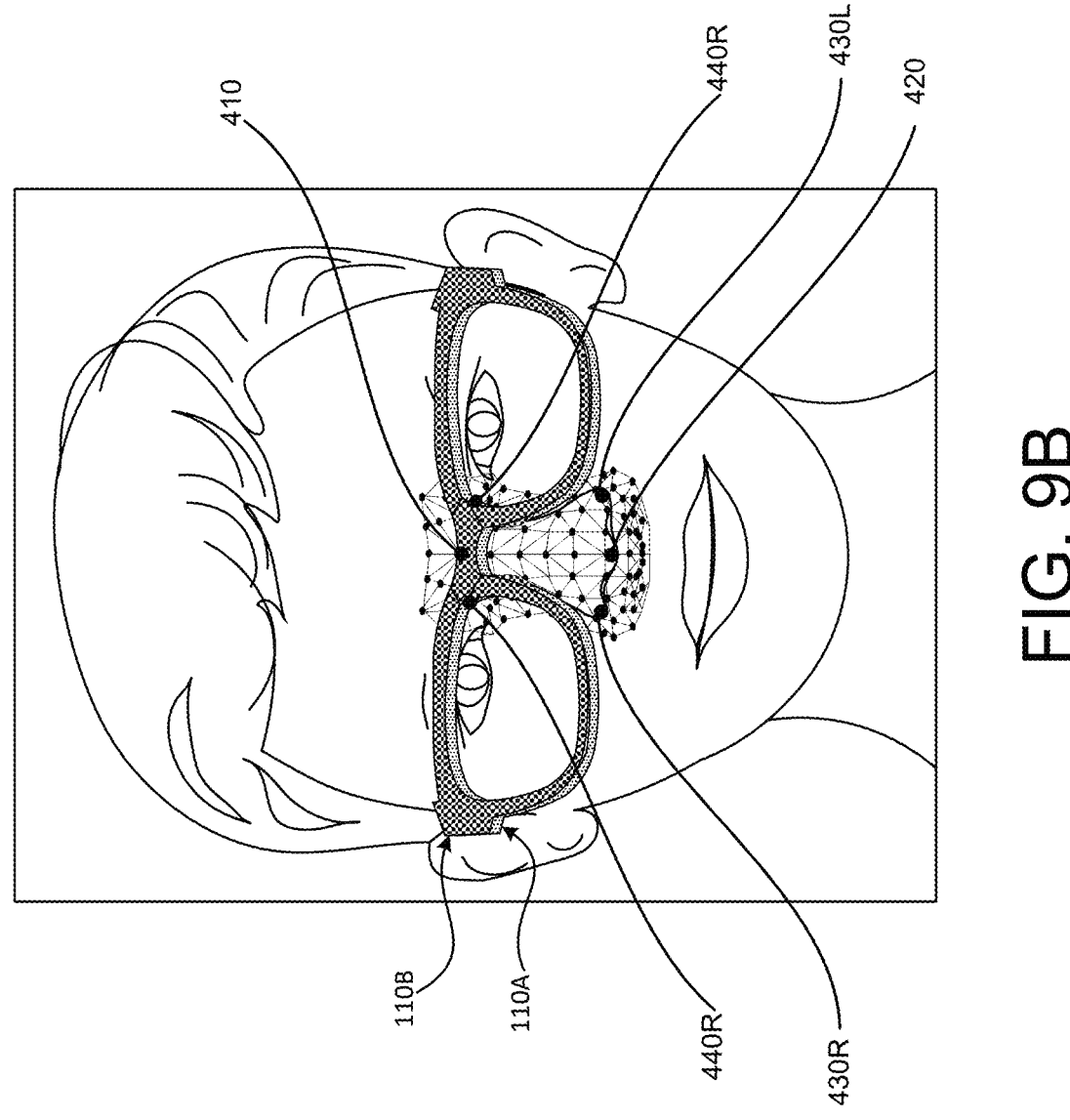

FIG. 8B illustrates a second frame configuration 110B including pads 180B coupled to the rim portions 123A, 123B, with a distance B2 between the contact portions 124A, 124B of the rim portions 123A, 123B that is changed from the distance B1. FIG. 9B illustrates the second frame configuration 110B, including the pads 180B, fitted on the user, superimposed on the three-dimensional mesh 600. The first frame configuration 110A is also shown in FIG. 9B, for purposes of comparison. As shown in FIG. 9B, the second frame configuration 110B is seated somewhat higher than the first frame configuration 110A on the bridge of the nose, and somewhat closer to the root end portion 415, or bridge of the nose.

Figure 9C:
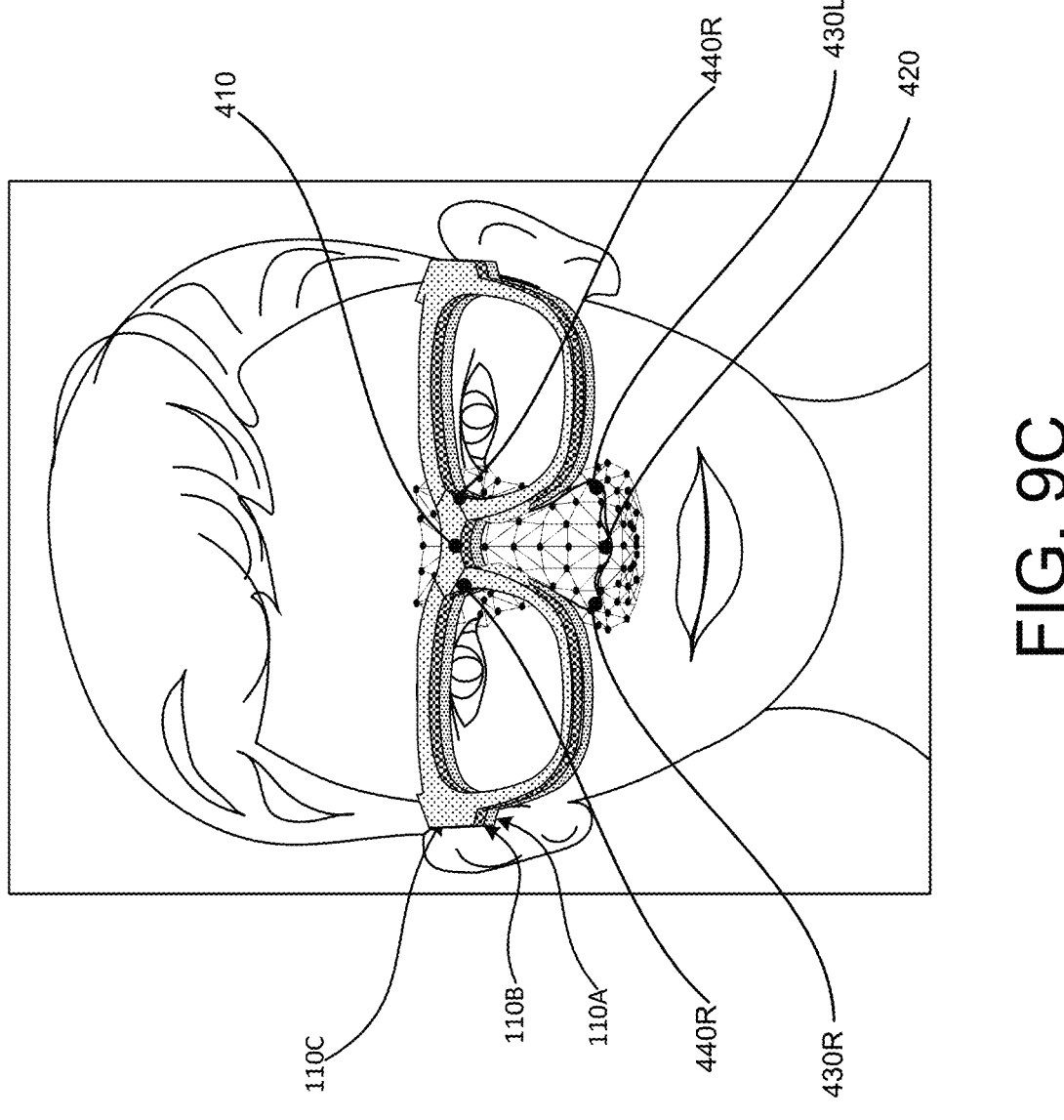

FIG. 8C illustrates a third frame configuration 110C including pads 180C coupled to the rim portions 123A, 123B, with a distance B3 between the contact portions 124A, 124B of the rim portions 123A, 123B that is changed from the distance B2 and/or the distance B1. FIG. 9C illustrates the third frame configuration 110C, including the pads 180C, fitted on the user, superimposed on the three-dimensional mesh 600. The second frame configuration 110B and the first frame configuration 110A are also shown in FIG. 9C, for purposes of comparison. As shown in FIG. 9C, the third frame configuration 110C is seated somewhat higher than the second frame configuration 110B, and somewhat higher than the first frame configuration 110A, on the bridge of the nose, and closer to the root end portion 415, or bridge of the nose.

Figure 9D:
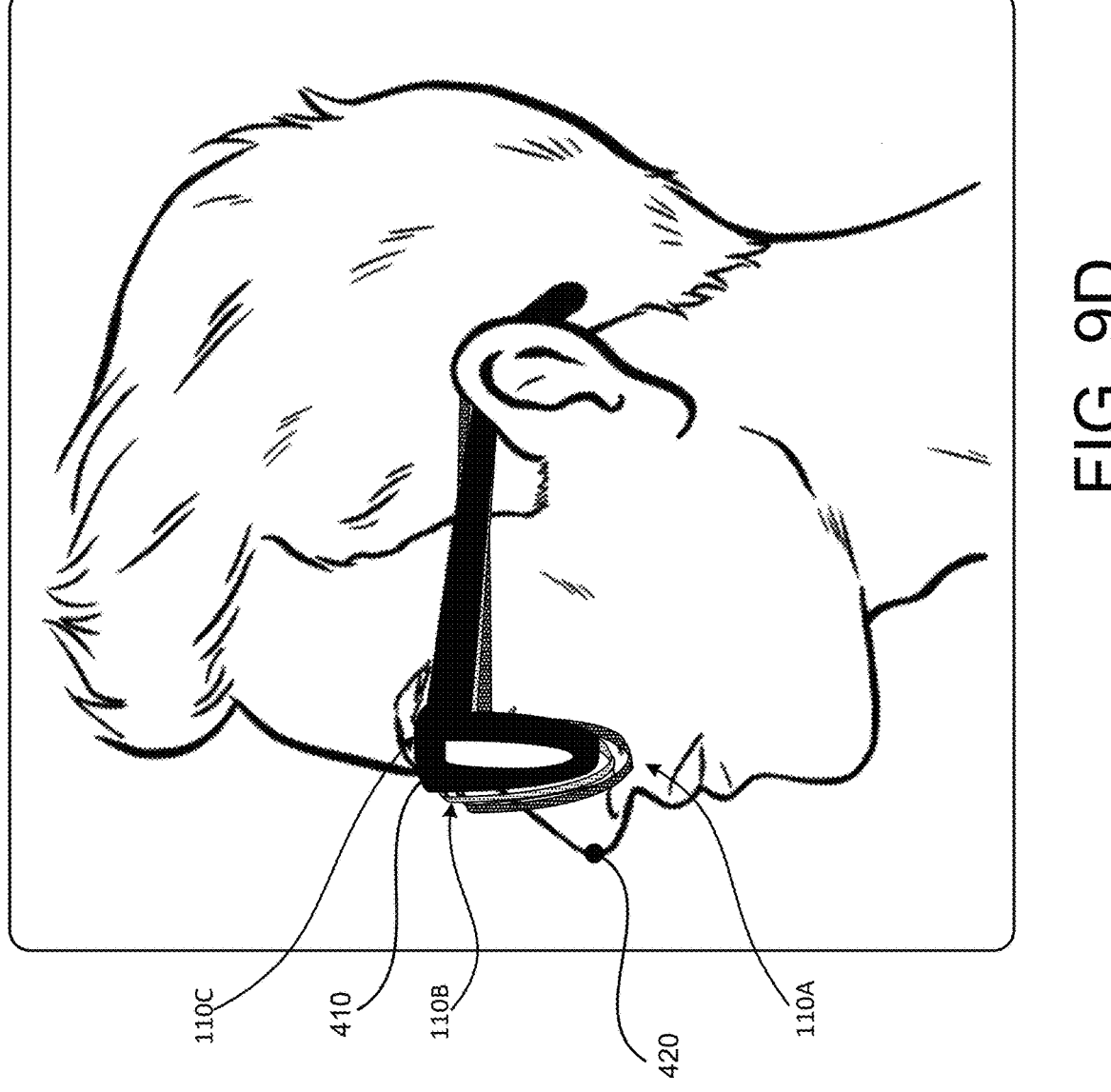

FIG. 9D illustrates a profile view of the first frame configuration 110A, the second frame configuration 110B, and the third frame configuration 110C, as worn by the user.

As shown in FIGS. 9C and 9D, a size and/or a shape and/or a configuration of the pads 180C included with the third frame configuration 110C may provide an improved fit of the frame 110 on the face/head of the user. The size and/or shape and/or configuration of the pads 180C included with the third frame configuration 110C may provide for improved alignment of the optical axis of the user with the curvature corrective lenses which may be included in the head mounted wearable device 100. That is, the addition of pads, for example as in the third frame configuration, may provide for adjustment to achieve the desired pantoscopic angle and/or the desired pantoscopic height and/or the desired vertex distance as discussed above with respect to FIGS. 2A-2C. The size and/or shape and/or configuration of the pads 180C included with the third frame configuration 110C may provide for improved alignment of the optical axis of the user with content output by the display device 106. The size and/or shape and/or configuration of the pads 180C included with the third frame configuration 110C may position the head mounted wearable device 100 on the nose/face of the user, and maintain the head mounted wearable device 100 on the nose/face of the user in a position that is more comfortable to the user and/or aesthetically pleasing.

The prediction of the sizing and/or fitting of the head mounted wearable device 100, including the selection of pads 180 for the sizing and/or fitting of the head mounted wearable device 100, based on a three-dimensional mesh generated from depth maps developed from one or more frames of image data may provide for the relatively accurate virtual sizing and/or fitting of the head mounted wearable device 100, without the use of specialized equipment and/or proctoring by a technician during a physical or virtual fitting session.

Systems and methods, in accordance with implementations described herein, may provide a prediction of fit of the head mounted wearable device 100 for the user based on image data, obtained by the user operating the computing device 200, combined with position and/or orientation data provided by one or more sensors of the computing device 200. In the examples described above, image data of the head and face of the user, and in particular, the nose of the user, is obtained by the image sensor 222 of a front facing camera of the computing device 200. In some situations, the collection of image data in this manner may pose challenges due to, for example, the relative proximity between the image sensor 222 of the front facing camera and the head/face of the user, inherent, natural movement of the head and face of the user as the computing device 200 is moved, combined with the need for accuracy in the fitting of head mounted wearable devices. The use of static key points, or elements, or features, in the background that anchor the captured image data as the computing device 200 is moved and sequential frames of image data are captured, may increase the accuracy of the depth data derived from the image data and position/orientation data, and the subsequent three-dimensional mesh, and the fitting of the head mounted wearable device fitted based on the three-dimensional mesh and/or extracted measurements. The collection of multiple frames of image data and the combining of the image data with corresponding position/orientation data associated with the computing device 200 as the series of frames of image data is collected, may improve the level of accuracy in prediction of fit of the head mounted wearable device.

In the examples described above, the example movement of the computing device 200 is in a substantially vertical direction, in front of the user, and in a substantially horizontal direction, across the front and to the left and right side profiles of the user, while the head and face of the user remain substantially still, or static. The image data obtained through the example movement of the computing device 200 as shown in FIGS. 5A-5J may provide for the relatively clear and detectable capture of the example facial landmarks and/or static key points/fixed elements as the perspective of the computing device 200 changes relative to the head/face of the user. In some examples, systems and methods, in accordance with implementations described herein, may be accomplished using other movements of the computing device 200 relative to the user.

Systems and methods, in accordance with implementations described herein, provide for the prediction of fit of a wearable device from image data and position/orientation data using a client computing device. In some implementations, systems and methods, in accordance with implementations described herein, provide for the determination of scale from the image data and position/orientation data obtained using the client computing device. Systems and methods, in accordance with implementations described herein, may provide for the prediction of fit from image data and position/orientation data without the use of a known reference object. Systems and methods, in accordance with implementations described herein, may predict fit from image data and position/orientation data without the use of specialized equipment such as, for example, depth sensors, pupilometers and the like that may not be readily available to the user. Systems and methods, in accordance with implementations described herein, may predict from image data and position/orientation data without the need for a proctored virtual fitting and/or access to a physical retail establishment. Systems and methods, in accordance with implementations described herein, may improve accessibility to the virtual selection and accurate fitting of wearable devices. The prediction of fit in this manner provides for a virtual try-on of an actual wearable device to determine wearable fit and/or ophthalmic fit and/or display fit of the wearable device.

Figure 10:
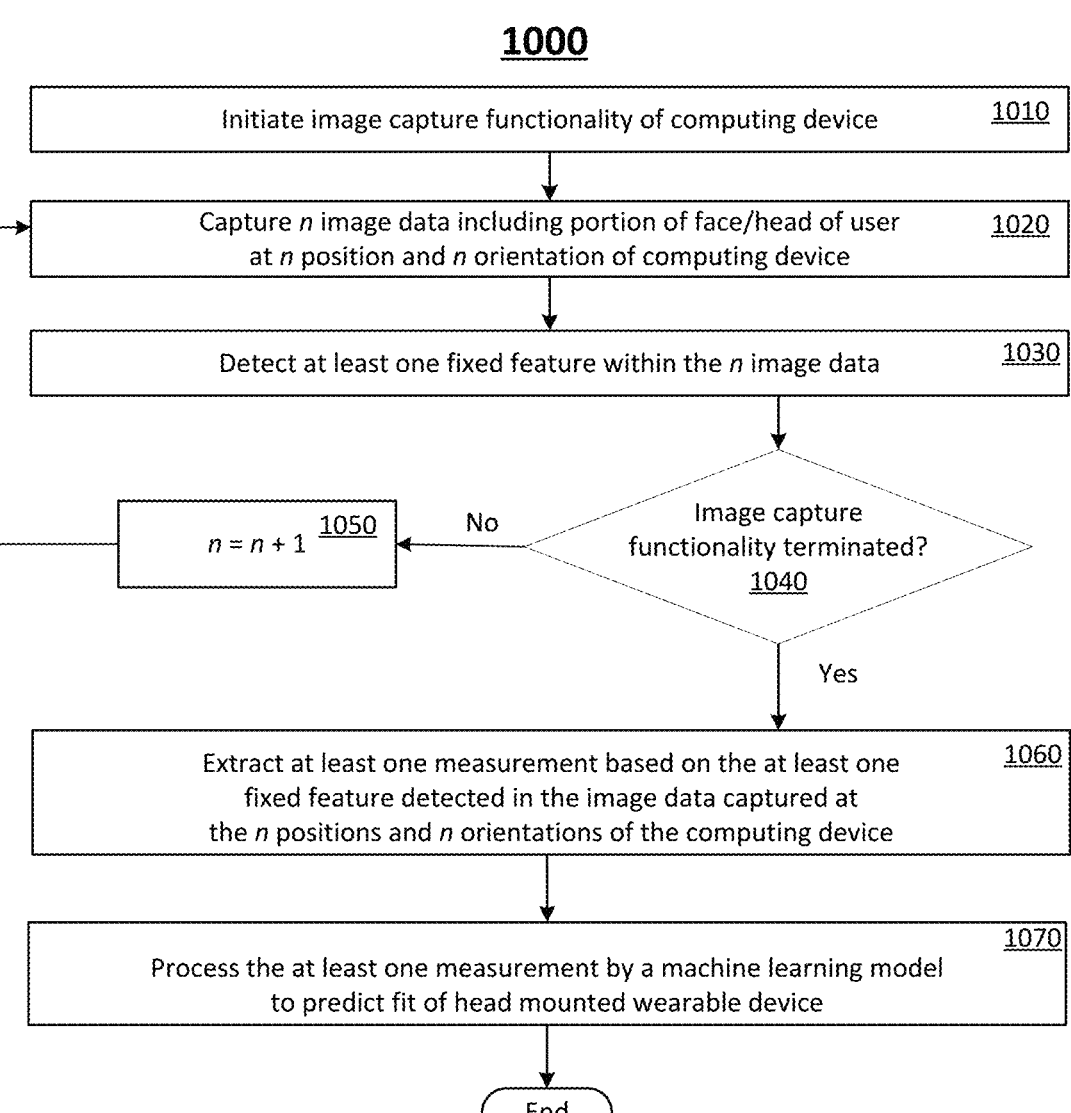
FIG. 10 is a flowchart of an example method, in accordance with implementations described herein.

FIG. 10 is a flowchart of an example method 1000 of predicting fit from image data and position/orientation data. A user operating a computing device (such as, for example, the computing device 200 described above) may initiate image capture functionality of the computing device (block 1010). In some examples, the image capture functionality may be operable within an application executing on the computing device. Initiation of the image capture functionality may cause an image sensor (such as, for example, the image sensor 222 of the front facing camera of the computing device 200 described above) to capture first image data including at least a portion of a face and/or a head of the user (block 1020). In some examples, the image data includes a nose of the user. In some examples, the first image data is captured at a first position and a first orientation of the computing device, for example, a first position and a first orientation of the computing device relative to the head of the user. In some examples, the position and orientation of the computing device may be provided based on, for example, data provided by position/orientation sensors of the computing device at a point corresponding to capture of the first image data. At least one fixed feature may be detected within the first image data (block 1030). The at least one fixed feature may include fixed facial features and/or landmarks that remain substantially static. The at least one fixed feature may include features defining the nose of the user, such as, for example, a width of the nose at a root end portion of the nose, corresponding to a bridge portion of the nose at which a bridge portion of a head mounted wearable device would be seated. In some examples, the at least one fixed feature may be defined by two facial landmarks detected in the image data.

Continued operation of the image capture functionality may cause the computing device to incrementally capture image data including the portion of the face and/or head of the user and the at least one fixed feature (block 1040, block 1050), until the image capture functionality is terminated. In some examples, the image capture functionality may be terminated when it is determined, for example, within the application executing on the computing device, that a sufficient amount of image data has been captured for the determination of measurements associated with one or more fixed features detected in the image data (block 1060). The extracted measurements may be processed by a machine learning model, and/or a simulator, to predict fit of a head mounted wearable device for the user (block 1070).

Figure 11:
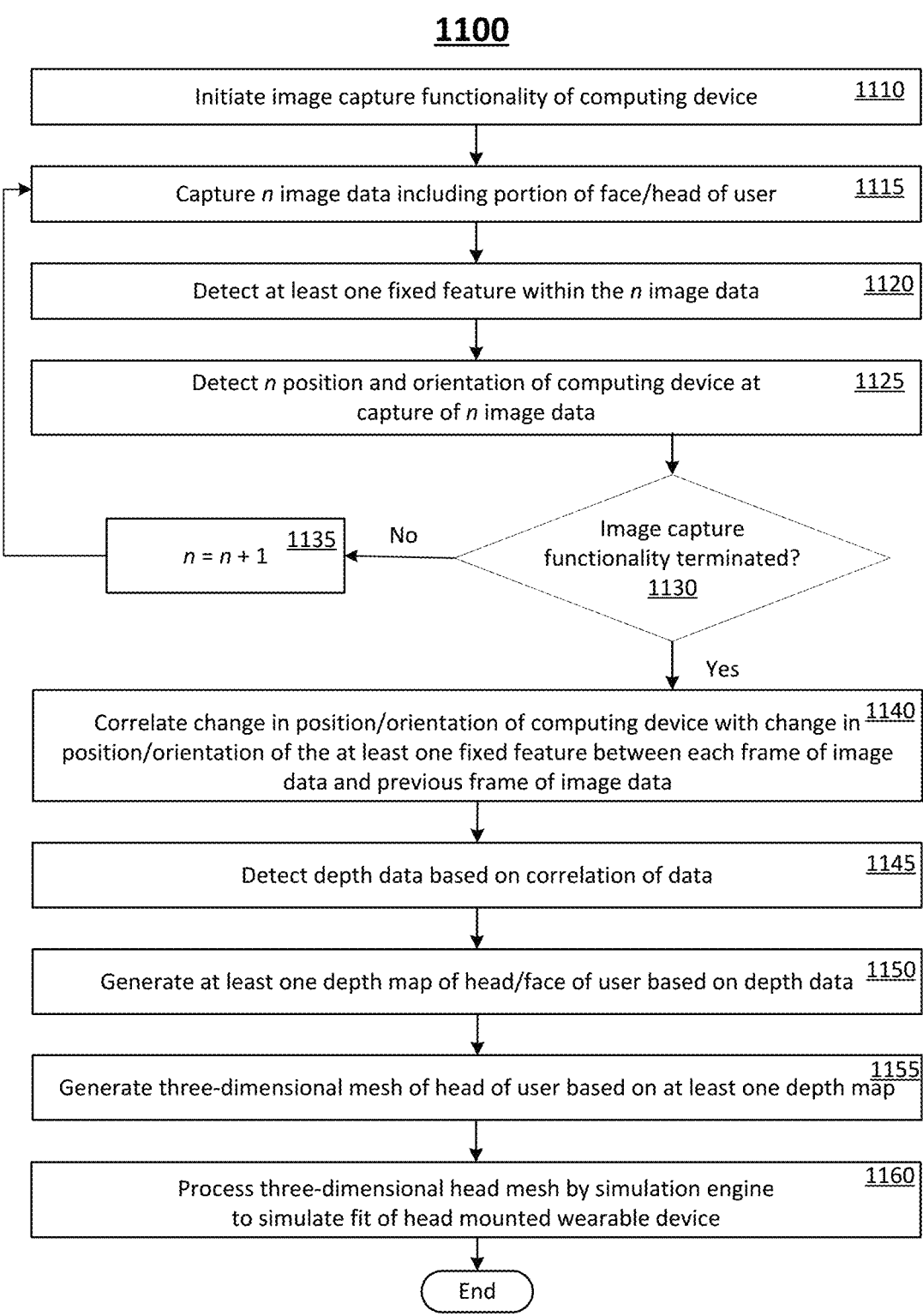
FIG. 11 is a flowchart of an example method, in accordance with implementations described herein.

FIG. 11 is a flowchart of an example method 1100 of simulating fit from image data and position/orientation data. A user operating a computing device (such as, for example, the computing device 200 described above) may initiate image capture functionality of the computing device (block 1110). In some examples, the image capture functionality may be operable within an application executing on the computing device. Initiation of the image capture functionality may cause an image sensor (such as, for example, the image sensor 222 of the front facing camera of the computing device 200 described above) to capture first image data including at least a portion of a face and/or a head of the user (block 1115). In some examples, the image data includes a nose of the user. At least one fixed feature may be detected within the first image data (block 1120). The at least one fixed feature may include fixed facial features and/or landmarks that remain substantially static. The at least one fixed feature may include features defining the nose of the user, such as, for example, a width of the nose at a root end portion of the nose, corresponding to a bridge portion of the nose at which a bridge portion of a head mounted wearable device would be seated. In some examples, the at least one fixed feature may be defined by two facial landmarks detected in the image data. A first position and a first orientation of the computing device may be detected (block 1125) based on, for example, data provided by position/orientation sensors of the computing device, at a position and an orientation of the computing device corresponding to capture of the first image data.

Continued operation of the image capture functionality may cause the computing device to incrementally capture second image data including the portion of the face and/or head of the user and the at least one fixed feature (block 1130, block 1135), until the image capture functionality is terminated. In some examples, the image capture functionality may be terminated when it is determined, for example, within the application executing on the computing device, that a sufficient amount of image data has been captured for the development of a three-dimensional mesh/three-dimensional model of the portion of the face and/or head of the user, for example, the nose of the user, for the purposes of predicting and/or simulating fit of a head mounted wearable device. Changes in the position and the orientation of the computing device may be correlated with changes in position of the at least one fixed feature detected in a current frame of image data compared to the position of the at least one fixed feature detected in a previous frame of image data (block 1140). Depth data may be extracted based on the comparison of the current image frame of data to the previous image frame of data, and the respective position of the at least one fixed feature (block 1145). At least one depth map of the portion of the face and/or head of the user may be generated based on the depth data extracted from the correlation of the position/orientation data of the computing device with the changes of position in the at least one fixed feature detected in the frames of image data (block 1150). The at least one depth map may be at least one depth map corresponding to the nose of the user. The depth maps may be fused, or stitched, together to develop a three-dimensional mesh, or a three-dimensional model, of the portion of the face and/or head of the user (block 1155), for example, a three-dimensional mesh, or a three-dimensional model, of the nose of the user. The three-dimensional mesh, and/or measurements extracted therefrom, may be processed by a simulator and/or a machine learning model, to simulate fit of a head mounted wearable device for the user (block 1160).

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method, comprising:

generating a three-dimensional model of a nose of a user based on depth data extracted from a correlation of a change in a position and orientation of a computing device with a change in a position of at least one fixed feature between a first image data of the nose of the user and a second image data of the nose of the user, the first image data and the second image data captured by an application executing on the computing device; and simulating, by a simulation engine accessible to the computing device, a fit of a head mounted wearable device on the user based on the three-dimensional model of the nose of the user;

wherein the at least one fixed feature includes at least two facial features that are representative of a fixed measurement associated with the nose of the user;

wherein at least one of the at least two facial features include:

a sellion at a root end portion of a nasal ridge of the nose;

a tip of the nose at a distal end portion of the nasal ridge of the nose;

an ala at a lower end portion of the nose, corresponding to a first lower end portion and a second lower end portion of the nose; or an inner corner portion of a right eye and an inner corner portion of a left eye of the user.

2. The computer-implemented method of claim 1, wherein the fixed measurement includes at least one of:

a width of the nose at the root end portion of the nose; or a slope of the nose along the nasal ridge of the nose.

3. The computer-implemented method of claim 2, wherein the width of the nose is representative of a distance between a right end portion of the nose at the root end portion of the nose, and a left end portion of the nose at the root end portion of the nose.

4. The computer-implemented method of claim 2, wherein the at least two facial features includes at least three facial features, including:

the sellion at the root end portion of the nasal ridge of the nose;

the tip of the nose at the distal end portion of the nasal ridge of the nose; and the ala at the lower end portion of the nose, corresponding to the first lower end portion and the second lower end portion of the nose.

5. The computer-implemented method of claim 4, wherein the fixed measurement includes:

a nose height, representative of a distance between the root end portion of the nose and at least one of the first lower end portion or the second lower end portion of the nose; and a nose depth, representative of a distance between the tip of the nose and at least one of the first lower end portion or the second lower end portion of the nose, wherein the slope is a quotient of the nose height divided by the nose depth.

6. The computer-implemented method of claim 1, further comprising:

generating, by the simulation engine, a simulated fit of the head mounted wearable device based on the simulating;

selecting a pair of adjustment pads, from a plurality of adjustment pads, that are selectively couplable to the head mounted wearable device; and generating a simulated adjusted fit of the head mounted wearable device including the pair of adjustment pads.

7. The computer-implemented method of claim 6, wherein the pair of adjustment pads includes a first adjustment pad that is selectively couplable to a first rim portion of the head mounted wearable device and a second adjustment pad that is selectively couplable to a second rim portion of the head mounted wearable device.

8. The computer-implemented method of claim 6, wherein generating the simulated adjusted fit includes adjusting at least one of:

a position of a bridge portion of the head mounted wearable device along the nasal ridge of the nose on the three-dimensional model of the nose; or an angular position of a front frame portion of the head mounted wearable device relative to the nasal ridge of the nose on the three-dimensional model of the nose.

9. The computer-implemented method of claim 1, further comprising:

determining a magnitude of movement of the computing device corresponding to the change in the position and orientation of the computing device based on a comparison of first data and second data, the first data and the second data provided by an inertial measurement unit of the computing device.

10. The computer-implemented method of claim 9, wherein the correlation of the change in the position and orientation of the computing device with the change in the position of the at least one fixed feature includes:

associating the magnitude of the movement of the computing device to a change in a measurement associated with the at least one fixed feature; and determining the depth data based on the associating.

11. The computer-implemented method of claim 1, further comprising:

repeatedly capturing image data as the computing device is moved relative to the user to capture image data from a plurality of different positions and orientations of the computing device relative to a head of the user;

correlating a plurality of changes in position and orientation of the computing device with a corresponding plurality of changes in position of the at least one fixed feature detected the image data;

determining depth data as the image data is repeatedly captured from the plurality of different positions and orientations based on the correlating; and developing the three-dimensional model of the nose of the user for predicting the fit of the head mounted wearable device based on the repeatedly capturing of the image data by the computing device from the plurality of different positions and orientations and the depth data determined from the repeatedly capturing of the image data.

12. The computer-implemented method of claim 1, wherein predicting, by the simulation engine accessible to the computing device, the fit of the head mounted wearable device includes:

generating the three-dimensional model of the nose of the user;

extracting the fixed measurement from the three-dimensional model; and selecting a head mounted wearable device, from a plurality of available head mounted wearable devices, based on the fixed measurement.

13. The computer-implemented method of claim 12, wherein the fixed measurement includes at least one of:

a nose width based on a distance between two of the at least two facial features detected in the first image data and the second image data; or a nose slope determined based on nose height and a nose depth, the nose height being based on a distance between two of the at least two facial features detected in the first image data and the second image data, and the nose depth being based on a distance between two of the at least two facial features detected in the first image data and the second image data.

14. A non-transitory computer-readable medium storing executable instructions that, when executed by at least one processor of a computing device, are configured to cause the at least one processor to:

generate a three-dimensional model of a nose of a user based on depth data extracted from a correlation of a change in a position and orientation of the computing device with a change in a position of at least one fixed feature between a first image data of the nose of the user and a second image data of the nose of the user, the first image data and the second image data captured by an application executing on the computing device; and simulate, by a simulation engine accessible to the computing device, a fit of a head mounted wearable device on the user based on the three-dimensional model of the nose of the user;

wherein the at least one fixed feature includes at least two facial features that are representative of a fixed measurement associated with the nose of the user;

wherein at least one of the at least two facial features include:

a sellion at a root end portion of a nasal ridge of the nose;

a tip of the nose at a distal end portion of the nasal ridge of the nose;

an ala at a lower end portion of the nose, corresponding to a first lower end portion and a second lower end portion of the nose; or an inner corner portion of a right eye and an inner corner portion of a left eye of the user.

15. The non-transitory computer-readable medium of claim 14, wherein the fixed measurement includes at least one of:

a width of the nose at the root end portion of the nose, corresponding to a distance between a right end portion of the nose at the root end portion of the nose, and a left end portion of the nose at the root end portion of the nose; or a slope of the nose along the nasal ridge of the nose, including:

a nose height, representative of a distance between the root end portion of the nose and at least one of the first lower end portion or the second lower end portion of the nose; and a nose depth, representative of a distance between the tip of the nose and at least one of the first lower end portion or the second lower end portion of the nose, wherein the slope is a quotient of the nose height divided by the nose depth.

16. The non-transitory computer-readable medium of claim 14, wherein the executable instructions are configured to cause the at least one processor to:

generate, by the simulation engine, a simulated fit of the head mounted wearable device based on the simulating;

select a pair of adjustment pads, from a plurality of adjustment pads, that are selectively couplable to the head mounted wearable device; and generate a simulated adjusted fit of the head mounted wearable device including the pair of adjustment pads.

17. The non-transitory computer-readable medium of claim 16, wherein the pair of adjustment pads includes a first adjustment pad that is selectively couplable to a first rim portion of the head mounted wearable device and a second adjustment pad that is selectively couplable to a second rim portion of the head mounted wearable device.

18. The non-transitory computer-readable medium of claim 16, wherein the executable instructions are configured to cause the at least one processor to generate the simulated adjusted fit, including adjusting at least one of:

a position of a bridge portion of the head mounted wearable device along a nasal ridge of the nose on the three-dimensional model of the nose; or an angular position of a front frame portion of the head mounted wearable device relative to the nasal ridge of the nose on the three-dimensional model of the nose.

* * * * *